(12) United States Patent
Subramanian et al.

(10) Patent No.: US 12,586,019 B2
(45) Date of Patent: Mar. 24, 2026

(54) WORKFLOW MANAGEMENT METHOD, SYSTEM AND COMPUTER PROGRAM PRODUCT WITH REAL TIME LOG, DEBUG AND RESUME FEATURES

(71) Applicant: Rakuten Mobile, Inc., Tokyo (JP)

(72) Inventors: Amutha Subramanian, Singapore (SG); Yash Wagh, Tokyo (JP); Seihin Shu, Tokyo (JP); Shirantha Madusanka Bandara Rathnayaka Mudiyanselage, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 218 days.

(21) Appl. No.: 18/006,390

(22) PCT Filed: Sep. 9, 2022

(86) PCT No.: PCT/US2022/042984
§ 371 (c)(1),
(2) Date: Jan. 23, 2023

(87) PCT Pub. No.: WO2024/054214
PCT Pub. Date: Mar. 14, 2024

(65) Prior Publication Data
US 2024/0257007 A1 Aug. 1, 2024

(51) Int. Cl.
G06Q 10/0633 (2023.01)
(52) U.S. Cl.
CPC .............................. G06Q 10/0633 (2013.01)

(58) Field of Classification Search
CPC ... G06Q 10/06; G06Q 10/0633; G06Q 10/063
See application file for complete search history.

(56) References Cited

U.S. PATENT DOCUMENTS

| | | | | | |
|---|---|---|---|---|---|
| 8,417,682 | B2* | 4/2013 | Wilcox | ................. | G06Q 40/02 |
| | | | | | 707/705 |
| 8,595,047 | B2* | 11/2013 | Bukovec | ............... | G06Q 10/06 |
| | | | | | 705/7.26 |

(Continued)

OTHER PUBLICATIONS

Hitachi, Ltd., "Integrated System Operation Management JP1 Version 10 Automation V10.5", Hitachi Social Innovation Forum 2015, Oct. 29, 2015, Japan, 10pp.

*Primary Examiner* — Johnna R Loftis
(74) *Attorney, Agent, or Firm* — HAUPTMAN HAM, LLP

(57) ABSTRACT
A workflow management system includes a processor, and a storage medium storing executable instructions. The executable instructions, when executed, instruct the processor to cause execution of a workflow including a plurality of tasks, in accordance with a sequence of the plurality of tasks in the workflow. Log information related to the plurality of tasks during the execution of the workflow is stored in a log storage. The workflow including the plurality of tasks arranged in the sequence is visually presented. In response to user selection of a task among the plurality of tasks of the workflow, task information related to the selected task is visually presented. In response to user selection of a log in the visually presented task information, the log information related to the selected task is retrieved from the log storage, and visually presented.

19 Claims, 15 Drawing Sheets

(56) References Cited

U.S. PATENT DOCUMENTS

| | | | |
|---|---|---|---|
| 8,621,421 B2 * | 12/2013 | Klaka .................... | G06Q 10/06 |
| | | | 717/115 |
| 8,886,553 B2 * | 11/2014 | Greef .................. | G05B 19/409 |
| | | | 705/7.11 |
| 2016/0196132 A1 * | 7/2016 | Searle ....................... | G06F 8/65 |
| | | | 717/173 |
| 2017/0199729 A1 * | 7/2017 | Yeh ........................... | G06F 8/35 |
| 2017/0364843 A1 * | 12/2017 | Haligowski ........ | G06Q 10/0633 |
| 2020/0169619 A1 * | 5/2020 | Bedi ..................... | G06F 9/5072 |
| 2023/0065530 A1 * | 3/2023 | Mohanty ............ | G06F 11/3608 |

* cited by examiner

200B

240

230 — Dashboard

232 — Element

234 — Workflow

242 — Workflow Template

244 — Factory

246 — Execute Workflow

236 — Function

300H

Figures 6A, 6B:
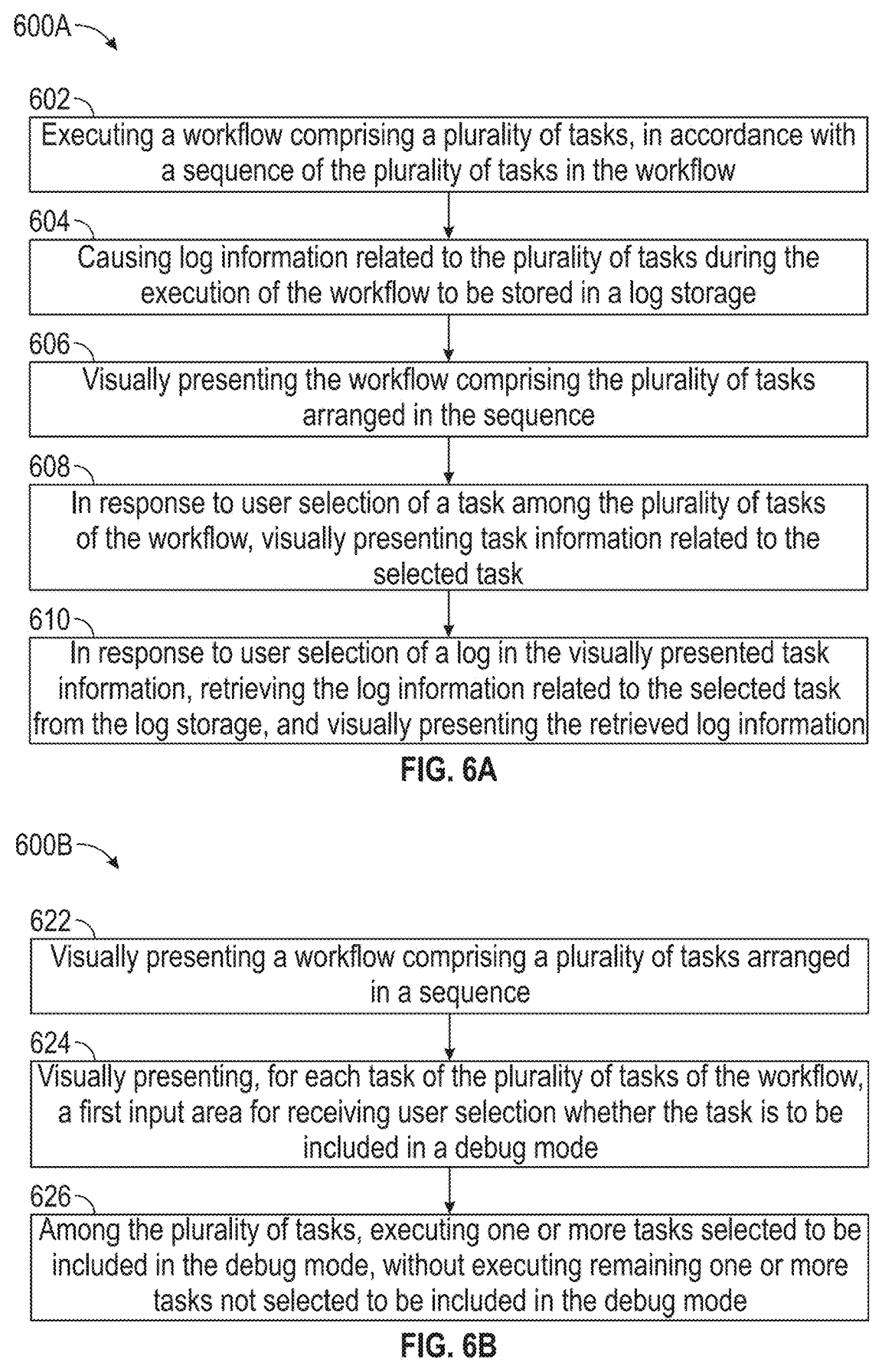

600A

602

Executing a workflow comprising a plurality of tasks, in accordance with a sequence of the plurality of tasks in the workflow

604

Causing log information related to the plurality of tasks during the execution of the workflow to be stored in a log storage

606

Visually presenting the workflow comprising the plurality of tasks arranged in the sequence

608

In response to user selection of a task among the plurality of tasks of the workflow, visually presenting task information related to the selected task

610

In response to user selection of a log in the visually presented task information, retrieving the log information related to the selected task from the log storage, and visually presenting the retrieved log information

Visually presenting a workflow comprising a plurality of tasks arranged in a sequence

624

Visually presenting, for each task of the plurality of tasks of the workflow, a first input area for receiving user selection whether the task is to be included in a debug mode

626

Among the plurality of tasks, executing one or more tasks selected to be included in the debug mode, without executing remaining one or more tasks not selected to be included in the debug mode

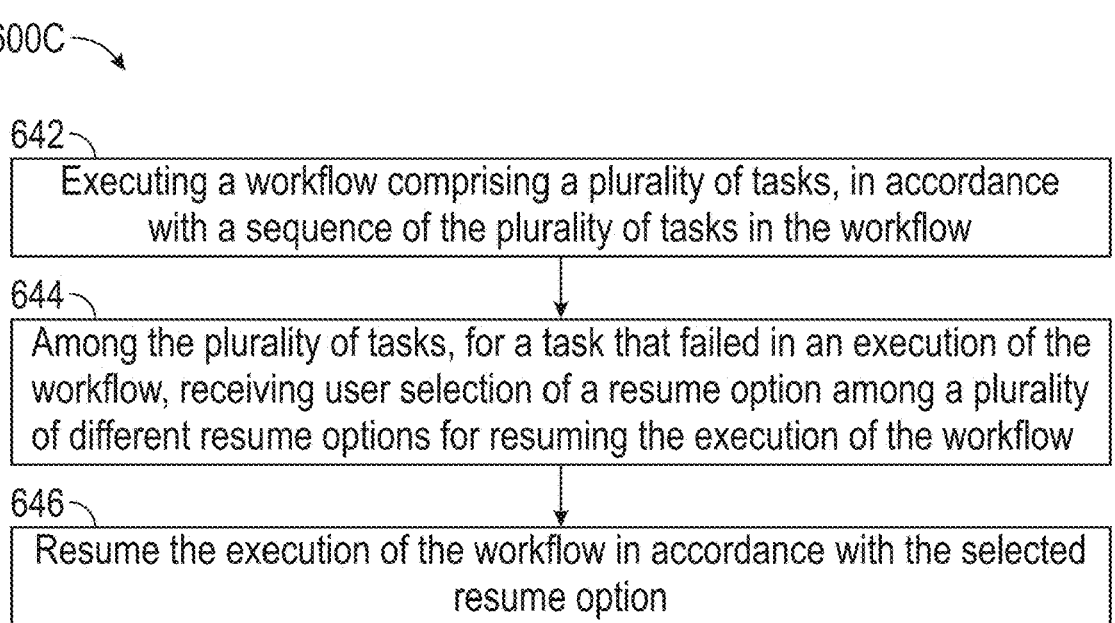

| 642 |
| --- |
| Executing a workflow comprising a plurality of tasks, in accordance with a sequence of the plurality of tasks in the workflow |

| 644 |
| --- |
| Among the plurality of tasks, for a task that failed in an execution of the workflow, receiving user selection of a resume option among a plurality of different resume options for resuming the execution of the workflow |

| 646 |
| --- |
| Resume the execution of the workflow in accordance with the selected resume option |

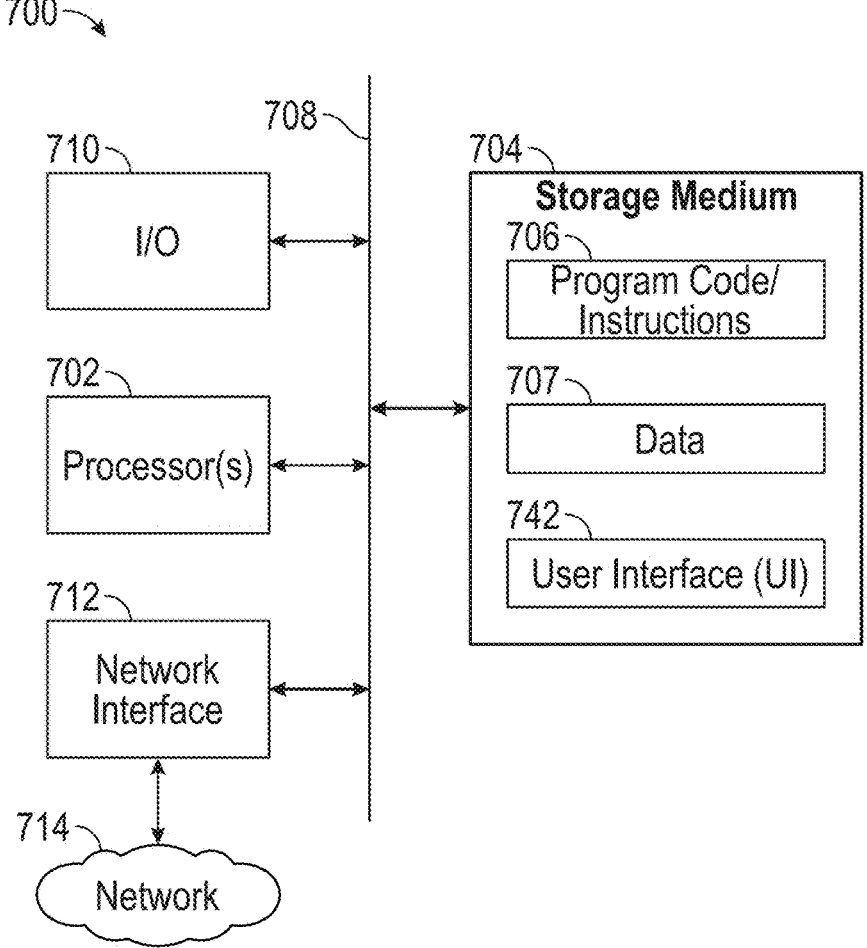

FIG. 7

WORKFLOW MANAGEMENT METHOD, SYSTEM AND COMPUTER PROGRAM PRODUCT WITH REAL TIME LOG, DEBUG AND RESUME FEATURES

RELATED APPLICATIONS

The present application is a National Phase of International Application No. PCT/US2022/042984 filed Sep. 9, 2022.

TECHNICAL FIELD

The present disclosure is related to workflows and workflow management.

BACKGROUND

Many industries, services, applications, businesses, etc. have procedures that are complex and prone to error due to various internal guidelines and/or external mandates. Workflows are developed to present such complex procedures in a manner that is easier for humans to follow the procedures, while reducing potential errors such as steps being omitted, or performed incorrectly or out of order, etc.

SUMMARY

In some embodiments, a workflow management system comprises at least one processor, and at least one computer readable storage medium coupled to the at least one processor and configured to store executable instructions. The executable instructions, when executed by the at least one processor, instruct the at least one processor to cause execution of a workflow comprising a plurality of tasks, in accordance with a sequence of the plurality of tasks in the workflow, cause log information related to the plurality of tasks during the execution of the workflow to be stored in a log storage, visually present the workflow comprising the plurality of tasks arranged in the sequence, in response to user selection of a task among the plurality of tasks of the workflow, visually present task information related to the selected task, and in response to user selection of a log in the visually presented task information, retrieve the log information related to the selected task from the log storage, and visually present the retrieved log information.

In some embodiments, a workflow management method is performed at least in part by at least one processor. The method comprises visually presenting a workflow comprising a plurality of tasks arranged in a sequence, visually presenting, for each task of the plurality of tasks of the workflow, a first input area for receiving user selection whether the task is to be included in a debug mode, and among the plurality of tasks, executing one or more tasks selected to be included in the debug mode, without executing remaining one or more tasks not selected to be included in the debug mode.

In some embodiments, a computer program product comprises a non-transitory, tangible computer readable storage medium storing a computer program that, when executed by at least one processor, instructs the at least one processor to cause execution of a workflow comprising a plurality of tasks, in accordance with a sequence of the plurality of tasks in the workflow. Among the plurality of tasks, for a task that failed in the execution of the workflow, user selection of a resume option among a plurality of different resume options for resuming the execution of the workflow is received. The execution of the workflow is resumed in accordance with the selected resume option.

BRIEF DESCRIPTION OF THE DRAWINGS

Aspects of the present disclosure are best understood from the following detailed description when read with the accompanying figure. In accordance with the standard practice in the industry, various features are not drawn to scale. In fact, the dimensions of the various features be arbitrarily increased or reduced for clarity of discussion.

FIGS. 6A-6C are flow charts of various processes in a workflow management system, in accordance with some embodiments.

FIG. 7 is a schematic block diagram of a computer system, in accordance with some embodiments.

DETAILED DESCRIPTION

Figure 1:
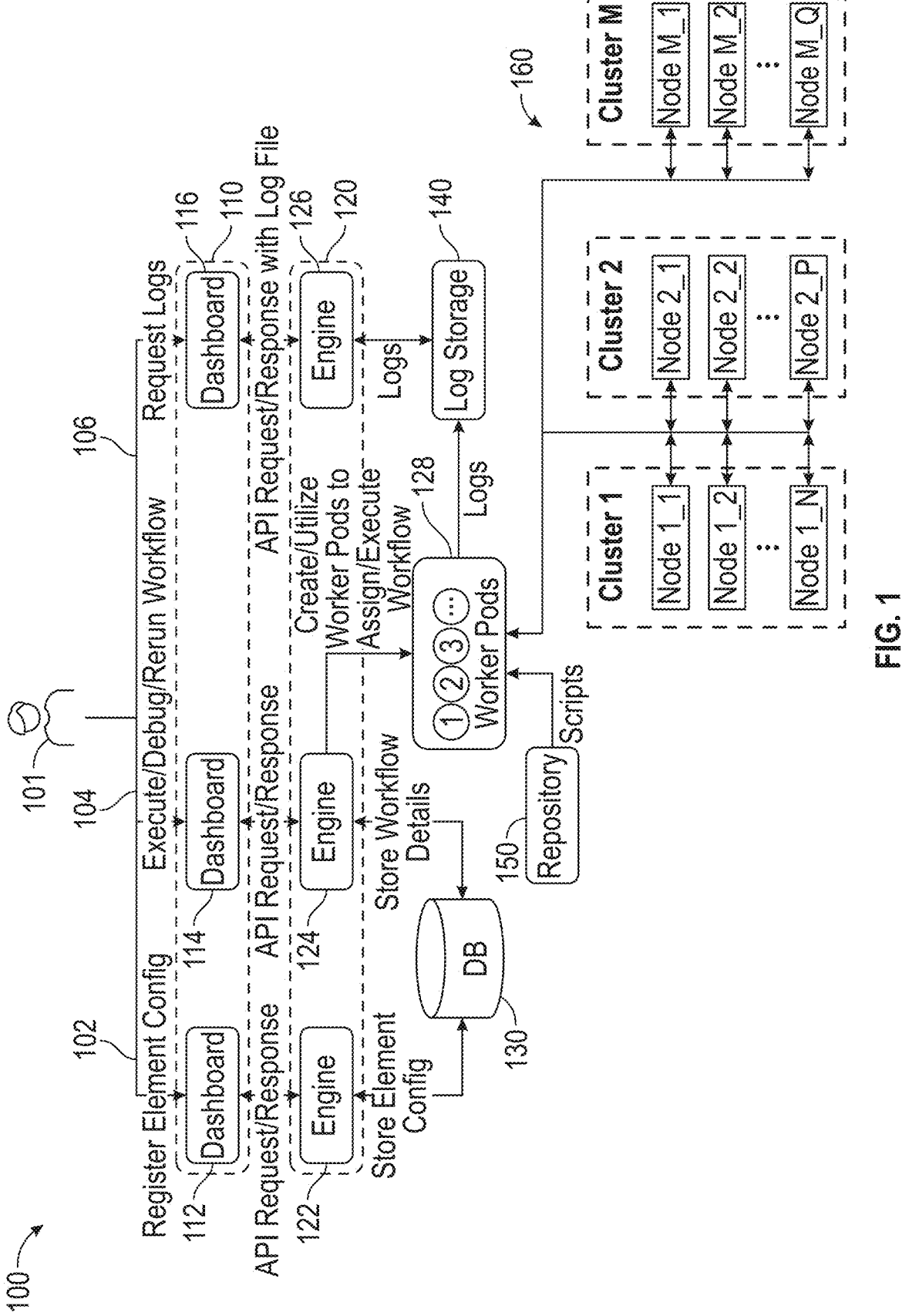
FIG. 1 is a schematic diagram of a workflow management system, in accordance with some embodiments.

The following disclosure includes many different embodiments, or examples, for implementing different features of the subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows include embodiments in which the first and second features are formed in direct contact, and also include embodiments in which additional features be formed between the first and second features, such that the first and second features not be in direct contact. In addition, the present disclosure repeats reference numerals and/or letters in the various examples. This repetition is for the purpose of simplicity and clarity and does not in itself dictate a relationship between the various embodiments and/or configurations discussed. Further, spatially relative terms, such as "beneath," "below," "lower," "above," "upper" and the like, be usable herein for ease of description to describe one element or feature's relationship to another element(s) or feature(s) as illustrated in the FIGS. The spatially relative terms are intended to encompass different orientations of the device in use or operation in addition to the orientation depicted in the FIGS. The apparatus be otherwise oriented (rotated 90 degrees or at other orientations) and the spatially relative descriptors usable herein likewise be interpreted accordingly.

A workflow presents, in a step-by-step manner, of a process for how work is to be done. Examples of processes include, but are not limited to, business and/or technical plans, procedures, customer support/service, or the like. In complex technical situations, or where the number of workflows and/or the number of tasks in a workflow is/are high, or where the tasks of one or more workflows are to be executed at one or more locations physically remote from a manager or supervisor, the ability to remotely monitor and/or control workflow execution is a consideration.

In some embodiments, during execution of a workflow, log information or logs generated by various functions, scripts, or applications are directed to a log storage. A workflow management system is configured to provide a manager, e.g., a user of the workflow management system, with a user interface (UI) for monitoring statuses of one or more workflows. The UI is configured to provide the user with options for selecting a task within a workflow, and for requesting log information related to the task. In response to the user's request, the log information related to the selected task is retrieved by the workflow management system from the log storage, and presented to the user through the UI. In at least one embodiment, the log information is retrieved and/or presented in real time. In at least one embodiment, the log information is retrieved and/or presented while the workflow is being executed. As a result, it is possible in one or more embodiments for the user to see the log information upon request, without having to wait until the workflow execution is completed. Based on the log information that is available upon request, it is possible for the user to make an early investigation and/or decision with respect to a potential issue that is delaying the whole process of workflow execution. The workflow management system is further configured to, through the UI, provide the user with various options for debugging and/or resuming (retrying) a workflow, in whole or in part. In at least one embodiment, such debugging and/or resuming capability, couple with the capability to obtain on-demand real time log information, provide the user with useful tools for effective workflow management. Further features and/or advantages are within the scopes of various embodiments.

FIG. 1 is a schematic diagram of a workflow management system 100, in accordance with some embodiments.

The workflow management system 100 comprises a dashboard microservice 110, engines 120, a database 130, and a log storage 140. A repository 150 and one or more elements 160 are also illustrated in FIG. 1. In at least one embodiment, the repository 150 is a part of the workflow management system 100. In some embodiments, the repository 150 is at least partially external to the workflow management system 100. The elements 160 are example of locations, sites or equipment where one or more workflows managed by the workflow management system 100 are executed.

In some embodiments, at least one, or some, or all of the components illustrated in FIG. 1, e.g., the dashboard microservice 110, engines 120, database 130, log storage 140, repository 150, elements 160, and/or their sub-components (e.g., modules 112, 114, 116 and/or engines 122, 124, 126) comprise(s) hardware on/by which software corresponding to various algorithms and/or operations described here is executed. An example hardware configuration for any one or more of the components illustrated in FIG. 1 includes a computer system described with respect to FIG. 7. For example, at least one, or some, or all of the components of the workflow management system 100, repository 150, elements 160, and/or their sub-components include(s) executable instructions stored in at least one computer-readable medium and executed by at least one hardware processor. In some embodiments, one or more of the components in the workflow management system 100 and/or their sub-components are implemented on/by a cloud platform. Other configurations are within the scopes of various embodiments.

The dashboard microservice 110 includes a plurality of modules configured to provide one or more functions and/or operations described herein. For illustration purposes, the dashboard microservice 110 in FIG. 1 includes modules 112, 114, 116. However, other numbers and/or types of modules are within the scopes of various embodiments. In at least one embodiment, at least one of the modules 112, 114, 116 includes a set of modules. In at least one embodiment, the example modules 112, 114, 116 are different from each other, or share at least one common module.

The dashboard microservice 110 comprises one or more modules configured to generate a graphic user interface (hereinafter "UI") for a user 101. The UI generated by the dashboard microservice 110 is visually presented to the user to help the user to manage various workflows and workflow executions as described herein. In some embodiments, an example of visual presentation of a workflow and/or screens of a UI includes displaying the workflow and/or UI screens on a display, such as a monitor or a touch screen. The display may be a display of a computer system implementing one or more components of the workflow management system 100, or a remote display coupled to one or more components of the workflow management system 100 through a network or communication link. Other ways for visually presenting information, such as projection on a screen, three-dimensional (3D) projection, using glasses and/or other head-mounted devices, or any other manners for presenting information to be visually perceptible by a user, are within the scopes of various embodiments. For simplicity, "displaying" or "displayed" may be used in the following description as an example manner for visual presentation of information. Other manners for visual presentation, as discussed herein, are not excluded. A user may interact with displayed, or otherwise visually presented, information by a pointing device (e.g., a mouse), a touch screen, contact-less gestures, voice commands, or the like.

The dashboard microservice 110 further comprises one or more modules configured to, by themselves and/or in cooperation with one or more corresponding engines in the engines 120, create, manage, execute and/or monitor various workflows as described herein. In some embodiments, the dashboard microservice 110 is configured to provide functionalities to perform create, read, update and delete (CRUD) operations on various objects including, but not limited to, workflows, tasks, elements, functions, or the like. In some embodiments, the dashboard microservice 110 is configured to perform one or more of workflow and/or task execution, monitoring, debugging, resuming, and reporting through role-based access control (RBAC). In some embodiments, the dashboard microservice 110 comprises at least one node application. In some embodiments, the dashboard microservice 110 comprises at least one web-based application.

The engines 120 are configured to perform, together with or under control of the dashboard microservice 110, various operations and/or functions as described herein. For illustration purposes, the engines 120 in FIG. 1 include engines 122, 124, 126. However, other numbers and/or types of engines are within the scopes of various embodiments. In at least one embodiment, at least one of the engines 122, 124, 126 includes a set of engines. In at least one embodiment, the engines 122, 124, 126 are different from each other, or share at least one common engine. Examples of the engines 120 include, but are not limited to, Operating System (OS) install, OS upgrade, cluster install (e.g., Robin cluster install), cluster uninstall (e.g., Robin cluster uninstall), cluster upgrade (e.g., Robin cluster upgrade), scall in/out, hardware (HW) heath check, firmware upgrade, Field Programmable Gate Array (FPGA) upgrade, OS/FPGA reports, authentication, or the like. The engines 120 are configured to interact with the dashboard microservice 110 by application programming interface (API) requests/responses. For simplicity, in the description herein, operations and/or functions and/or controls performed by the dashboard microservice 110 and/or engines 120 are sometimes referred to as being performed by the system, or by the/a/at least one processor.

In an example operation 102, the UI of the dashboard microservice 110 provides the user 101 with at least one option to register an element configuration. For example, the user 101 interacts with the UI to provide user input for an element configuration to the module 112 of the dashboard microservice 110. The module 112 instructs the engine 122 to store the element configuration in the database 130.

An element configuration is a configuration or description of an element. In some embodiments, an element comprises one or more sites or equipment (e.g., a computer system) where one or more tasks of a workflow is/are executed. Examples of elements, as described herein, include, but are not limited to, bare metals, clusters, or the like. In some embodiments, a bare metal (BM) is a computer system without an OS and installed applications. In at least one embodiment, a BM comprises computer hardware that is installed with firmware, or basic input/output system (BIOS) software utility, or no software at all. In some embodiments, a BM after installation of an OS and one or more required applications becomes a server. In some embodiments, a node refers to a BM before or after OS installation. A cluster comprises a group of nodes interconnected and configured to work in cooperation. An example cluster is a Robin cluster (RC). Other cluster configurations are within the scopes of various embodiments. In some embodiments, to configure a group of nodes as a cluster, a first node in the group is installed or configured as a Primary Master (PM), at least one second node in the group is installed or configured as at least one Secondary Master (SM), and one or more further nodes in the group is/are installed or configured as one or more Agents.

The elements 160 in FIG. 1 include examples of nodes and clusters. The elements 160 comprises M clusters, i.e., Cluster 1, Cluster 2, . . . Cluster M. Each cluster comprises a number of nodes. For example, Cluster 1 comprises N nodes, i.e., Node 1_1, Node 1_2, . . . Node 1_N, Cluster 2 comprises P nodes, i.e., Node 2_1, Node 2_2, . . . Node 2_P, . . . Cluster M comprises Q nodes, i.e., Node M_1, Node M_2, . . . Node M_Q, where, M, N, P, Q are natural numbers. In some embodiments, an element comprises a cluster, or a group of nodes to be installed as a cluster. In at least one embodiment, an element comprises at least one node in a cluster, or at least one independent node not included in a cluster. A specific example described herein involves execution of a workflow to configure a group of BMs as a cluster. This specific example is not-limiting. Other use cases and/or scenarios and/or applications of the workflow management system 100 are within the scopes of various embodiments. In a specific example, each cluster is, or constitutes a part of, a data center.

In a further example operation 104, the UI of the dashboard microservice 110 provides the user 101 with various options to build, execute, debug and/or resume a workflow. For example, the user 101 interacts with the UI to build a workflow comprising a plurality of tasks arranged or connected in a sequence. In some embodiments, the system, or another component outside the workflow management system 100, is configured to provide an environment, e.g., a graphing environment, for users to build workflows, and to save workflow configurations of the built workflows as Extensible Markup Language (XML) documents to be executed by a workflow engine among the engines 120 at runtime. In some embodiments, the workflow are compliant with the Business Project Management Notation (BPMN) specification. Other workflow configurations and/or specifications and/or programing language or codes are within the scopes of various embodiments. In some embodiments, the system, or another component outside the workflow management system 100, comprises a template repository (or template manager) that contains prestored workflows which can be used as templates based on which new workflows may be quickly built. Workflow configurations created by or loaded into the workflow management system 100 are stored, e.g., by the engine 124 into the database 130. The database 130 comprises a single database or a set of database that stores workflow configurations and element configurations. In some embodiments, the database 130 further stores workflow data generated during, and/or as a result of, execution of one or more workflows by the workflow engine.

The UI of the dashboard microservice 110 further provides the user 101 with various options to execute the built workflow, or execute a preexisting workflow. In an example, the engine 124 receives, through the module 114, user input of a workflow and an element where the workflow is to be executed. The engine 124 loads the corresponding element configuration and workflow configuration from the database 130, and dynamically modifies the workflow as necessary based on the element configuration and workflow configuration. The engine 124 creates one or more worker pods 128, or utilizes one or more existing worker pods 128, and then assigns the one or more worker pods 128 to execute the workflow as modified based on the element configuration and workflow configuration. In some embodiments, the described dynamical workflow modification is omitted.

In at least one embodiment, the one or more worker pods 128 are created to execute functions associated with one or more tasks of the workflow to be executed. For example, each task runs in its own worker pod, so to execute a function associated with a task a worker pod is required, which is the actual instance that executes the task. In some situations, a task to be executed is not associated with a function in the workflow management system 100, but with one or more external scripts. In such situations, the one or more worker pods 128 load the one or more scripts from the repository 150, and cause the functions and/or scripts associated with the tasks in the workflow to be executed at the designated element (e.g., at a cluster or one or more nodes among the elements 160) in accordance with the sequence of the tasks in the workflow.

As the tasks (e.g., functions and/or scripts) are executed, log information related to the tasks and/or the nodes where the tasks are executed is generated and sent from the nodes to the one or more worker pods 128. Examples of log information include, but are not limited to, statuses, parameters, variables, conditions or the like. The one or more worker pods 128 redirect the log information to the log storage 140 to be stored therein. An example of how log information is collected and stored is described with respect to FIG. 5.

Various options for debugging and/or resuming a workflow are also provided by the UI to the user 101. Based on user input or user selection of an option for debugging or resuming a workflow received through the module 114, the engine 124 makes appropriate correction in its instructions to the one or more worker pods 128 which cause the workflow to be executed, fully or partly, in accordance with the selected debugging or resuming option.

In some embodiments, at least one of the log storage 140 or repository 150 comprises a database implemented by one or more computer systems. In at least one embodiment, the one or more worker pods 128 include deployable units of computing that are created and managed in Kubernetes. Other worker pod configurations are within the scopes of various embodiments. In some embodiments, the worker pods are omitted or replaced with other virtual machines.

In another example operation 106, the UI of the dashboard microservice 110 provides the user 101 with at least one option to request real time log information related to a selected task of a selected workflow. For example, in response to the user's request for log information received through the UI, the module 116 sends the user's request to the engine 126. The engine 126 accesses the log storage 140 to retrieve the log information corresponding to the selected task of the selected workflow identified in the user's request, and sends the retrieved log information through the module 116 back to the UI where the log information is displayed to the user. In some embodiments, while the user is reviewing the log information (e.g., while the log information is still displayed), updated or new log information related to the selected task/workflow is updated in real time on the UI. In some embodiments, a potential error reflected in the displayed log information is fixed, located, or bypassed by using a debugging option and/or a resuming option as described herein.

FIGS. 2A-2B and 3A-3H are schematic diagrams showing various screens or panels of a UI in a workflow management system, in accordance with some embodiments. In some embodiments, the UI is provided in the workflow management system 100 and generated by the dashboard microservice 110.

Figure 2A:
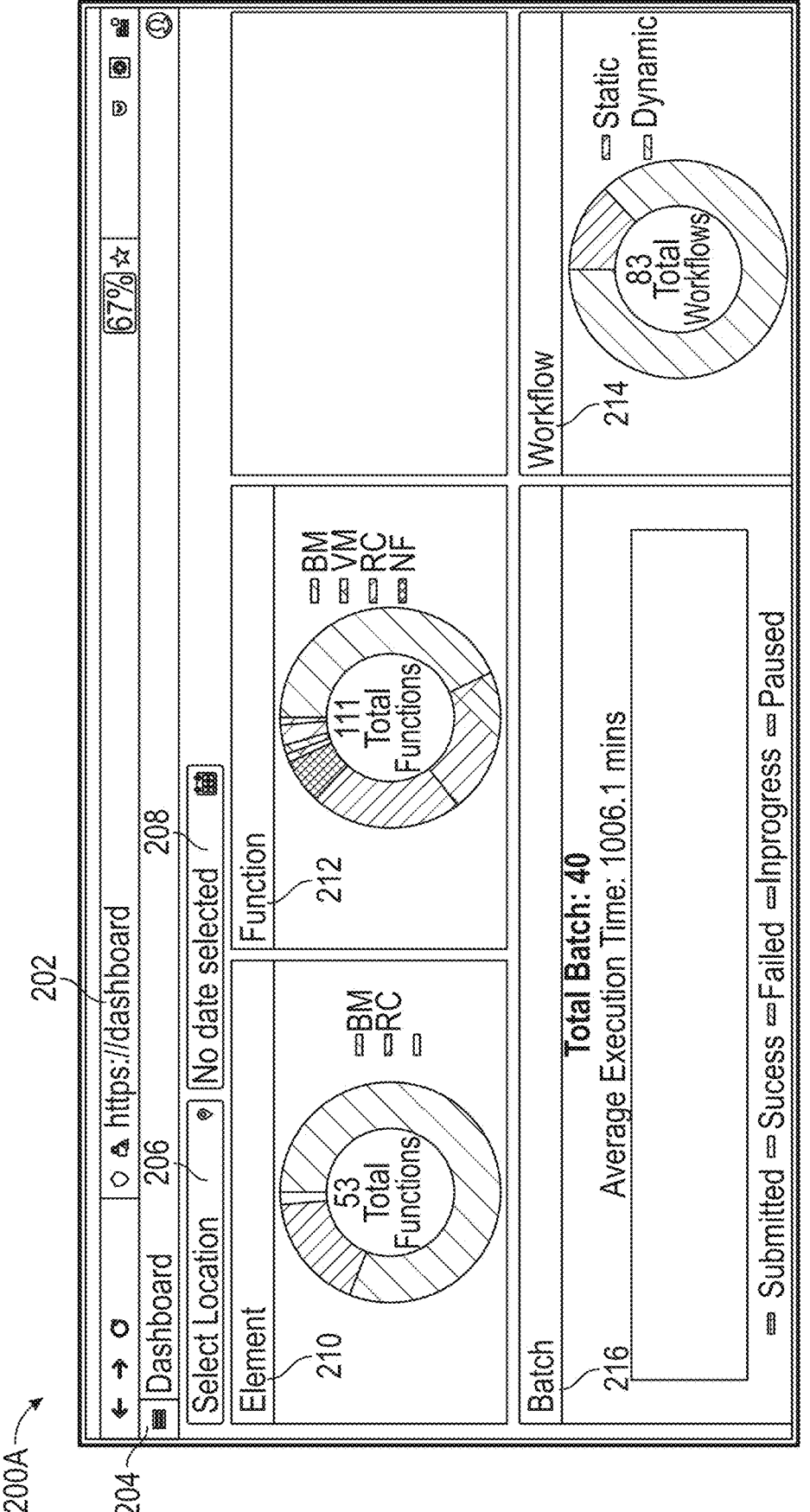
FIGS. 2A-2B and 3A-3H are schematic diagrams showing various screens or panels of a user interface in a workflow management system, in accordance with some embodiments.

FIG. 2A is a schematic diagram of a dashboard screen 200A of the UI, in accordance with some embodiments. In some embodiments, the dashboard screen 200A is displayed upon successful authentication of a user who logs in the workflow management system 100. The dashboard screen 200A comprises an address bar 202, a setting button 204, a location selection menu 206, a date selection menu 208, and a plurality of visualization areas 210, 212, 214, 216.

The address bar 202 includes an address for accessing the dashboard screen 200A using a web browser. For simplicity, details of the address are omitted. One or more other screens of the UI as described herein also include a similar address bar. The address bar in one or more other screens is omitted for simplicity. In at least one embodiment, the web-based UI provides a flexibility in that a user may remotely log in and manage workflows using the workflow management system 100. In at least one embodiment, the UI is not web-based and the address bar is omitted.

Figure 2B:
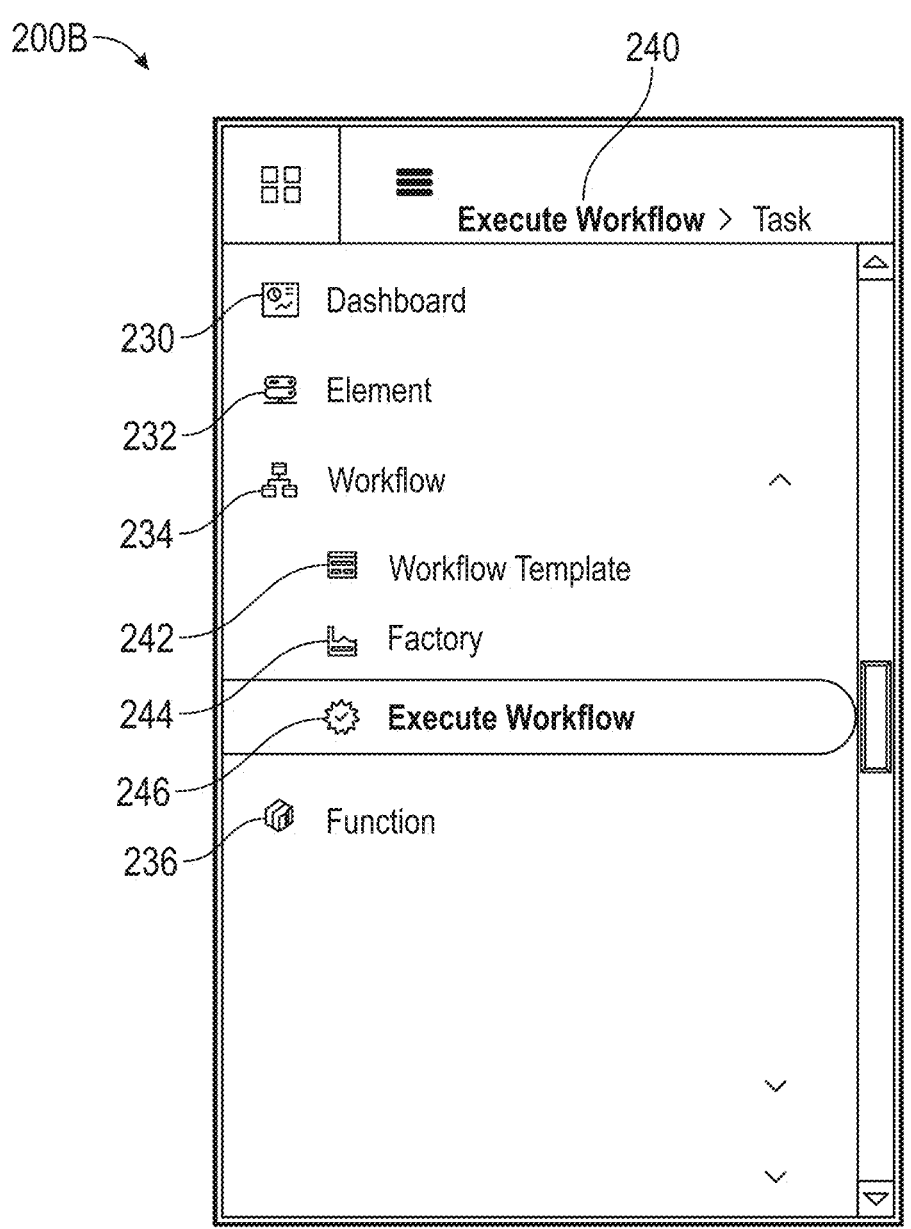

The setting button 204 is configured to permit access to other screens of the UI. For example, upon user operation of the setting button 204, a screen 200B in FIG. 2B is displayed, either in addition to or in place of a current screen. Details of the screen 200B are provided herein with respect to FIG. 2B.

The visualization areas 210, 212, 214, 216 provide overview information about various items in the workflow management system 100. For example, the visualization area 210 provides a count of elements registered under respective element types in the workflow management system 100. In the example configuration in FIG. 2A, the visualization area 210 shows that there are 53 elements, about 80% of which are registered under the BM type (bare metal) and about 20% of which are registered under the RC type (Robin cluster).

The visualization area 212 provides a count of functions registered in the workflow management system 100, and the types of elements the functions support. In some embodiments, one or more functions are associated with a task in a workflow, to be executed at a corresponding element when the workflow is executed. In the example configuration in FIG. 2A, the visualization area 212 shows that there are 111 functions which support various element types, i.e., BM, VM (virtual machine), RC, and NF (network function). The described list of element types is a non-limiting example.

The visualization area 214 provides a count of workflows in the workflow management system 100, and their corresponding workflow types. In the example configuration in FIG. 2A, the visualization area 214 shows that there are 83 workflows, about 80% of which are dynamic workflows, and about 20% of which are static workflows. A dynamic workflow, as described herein, is dynamically and automatically modifiable by the system based on at least the element configuration of an element at which the workflow is selected to be executed. In some embodiments, this dynamic feature permits a dynamic workflow to be automatically re-configured to be executed at any of multiple elements. A static workflow is not configured to be modifiable dynamically and automatically by the system. In some embodiments, a static workflow is specifically configured to be executed at a specific element, rather than at multiple elements as described with respect to dynamic workflows.

The visualization area 216 provides a count of batches of workflows, and the average execution time. One or more of the visualization areas 210, 212, 214, 216 are omitted or configured to show other data, in accordance with some embodiments.

The location selection menu 206 and date selection menu 208 permit the user to show data in the visualization areas 210, 212, 214, 216 as filtered by a location selected from the location selection menu 206, and/or by a date selected from the location selection menu 206. In some embodiments, at least one of the location selection menu 206 and date selection menu 208 is omitted.

FIG. 2B is a schematic diagram of the screen 200B of the UI, in accordance with some embodiments.

As described herein the screen 200B is displayed upon user operation of the setting button 204 in the dashboard screen 200A. One or more other screens of the UI as described herein also include the screen 200B at a side to help the user to navigate through various screens and/or options in the UI. For simplicity, the screen 200B that may occur along with one or more screens of the UI as described herein is omitted.

The screen 200B comprises a plurality of selectable menu items 230, 232, 234, 236 for correspondingly accessing the dashboard screen 200A, a screen for managing (e.g., registering or editing or deleting) element configurations as described with respect to operation 102, a screen for managing and/or executing workflow configurations as described with respect to operation 104, and a screen for managing one or more functions to be associated with one or more tasks in various workflows managed by the workflow management system 100.

The screen 200B further comprises selectable sub-menu items 242, 244, 246 under the menu item 234. The Workflow Template sub-menu item 242 is configured to provide access to a repository (or list) of workflow templates usable for building new workflows.

The Factory sub-menu item 244 is configured to provide access to a repository (or list) of workflows managed by the workflow management system 100. The user is provided with various options for executing a workflow selected from the list on one or more elements, deleting an existing workflow from the list, refreshing the list of workflows, or filtering the list of workflows for creating, editing, deleting workflows. The user is further provided with various options for debugging a workflow as described, e.g., with respect to FIGS. 3E-3F.

The Execute Workflow sub-menu item 246 is configured to display a list of executed workflows. As example of such a list is described with respect to FIG. 3A. The user is provided with at least one option for requesting real time log information related to a selected task, as described herein, e.g., with respect to FIGS. 3B-3D. The user is further provided with various options for resuming (rerunning) a workflow, in whole or in part, as described herein, e.g., with respect to FIGS. 3B-3D. Further features include displaying configurations of a task, refreshing the list of executed workflows, or filtering the list of executed workflows based on status and start date.

The screen 200B further comprises a navigation indicator 240 that indicates the user's current location within the UI. In the example configuration in FIG. 2B, the navigation indicator 240 "Execute Workflow" corresponds to the currently selected Execute Workflow sub-menu item 246.

Figure 3A:
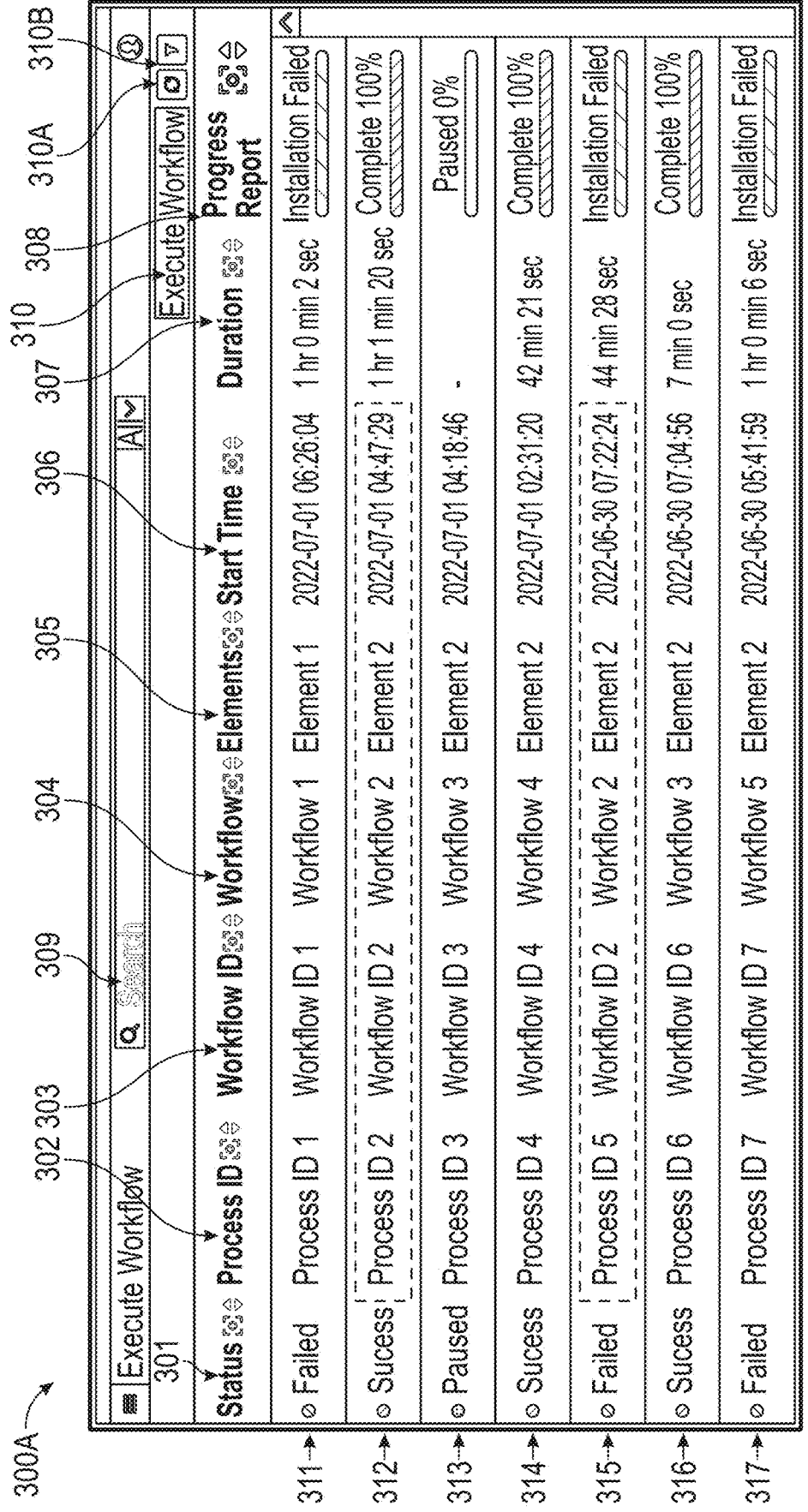

FIG. 3A is a schematic diagram of a screen 300A of the UI, in accordance with some embodiments. In some embodiments, the screen 300A is displayed upon user selection of the Execute Workflow sub-menu item 246 in the screen 200B.

The screen 300A includes a list of executed workflows 311-317 each corresponding to a row in the list. Each executed workflow includes a corresponding status (failed, success, or paused), process ID (identification), workflow ID, workflow name, the element at which the workflow is executed, start time, duration, and progress report correspondingly under columns 301-308. The screen 300A further comprises a search bar 309 to permit the user to search for a particular executed workflow. The screen 300A also includes a button 310 to permit the user to execute a workflow selected from the list, a button 310A for refreshing the list, and a button 310B for filtering the list.

For each of the executed workflows 311-317, the workflow name (column 304) is a human understandable and/or descriptive name given to the workflow when the workflow is created or loaded in to the workflow management system 100.

The workflow ID (column 303) is a unique identification automatically generated by the system for each workflow.

The element (column 305) is a human-understandable name of, or a unique identification automatically generated by the system for, the element at which the workflow is executed. In at least one embodiment, multiple elements are displayed, e.g., when the user executes OS installation (a workflow) on multiple clusters (elements).

The process ID (column 302) is a unique identification automatically generated by the system. In case of a batch of workflows, process ID will be same for all the elements. For instance, when a user wants to execute one workflow (e.g., OS installation) on multiple clusters, one process ID will be automatically created by the system for this batch of workflow. In some situations, as illustrated at workflows 312, 315, the same workflow (workflow ID2) executed on the same element (Element 2) but at different start times will result in different process IDs (process ID2 and process ID5). In at least one embodiment, the process ID is unique to every instance of execution of a workflow.

Figure 3B:
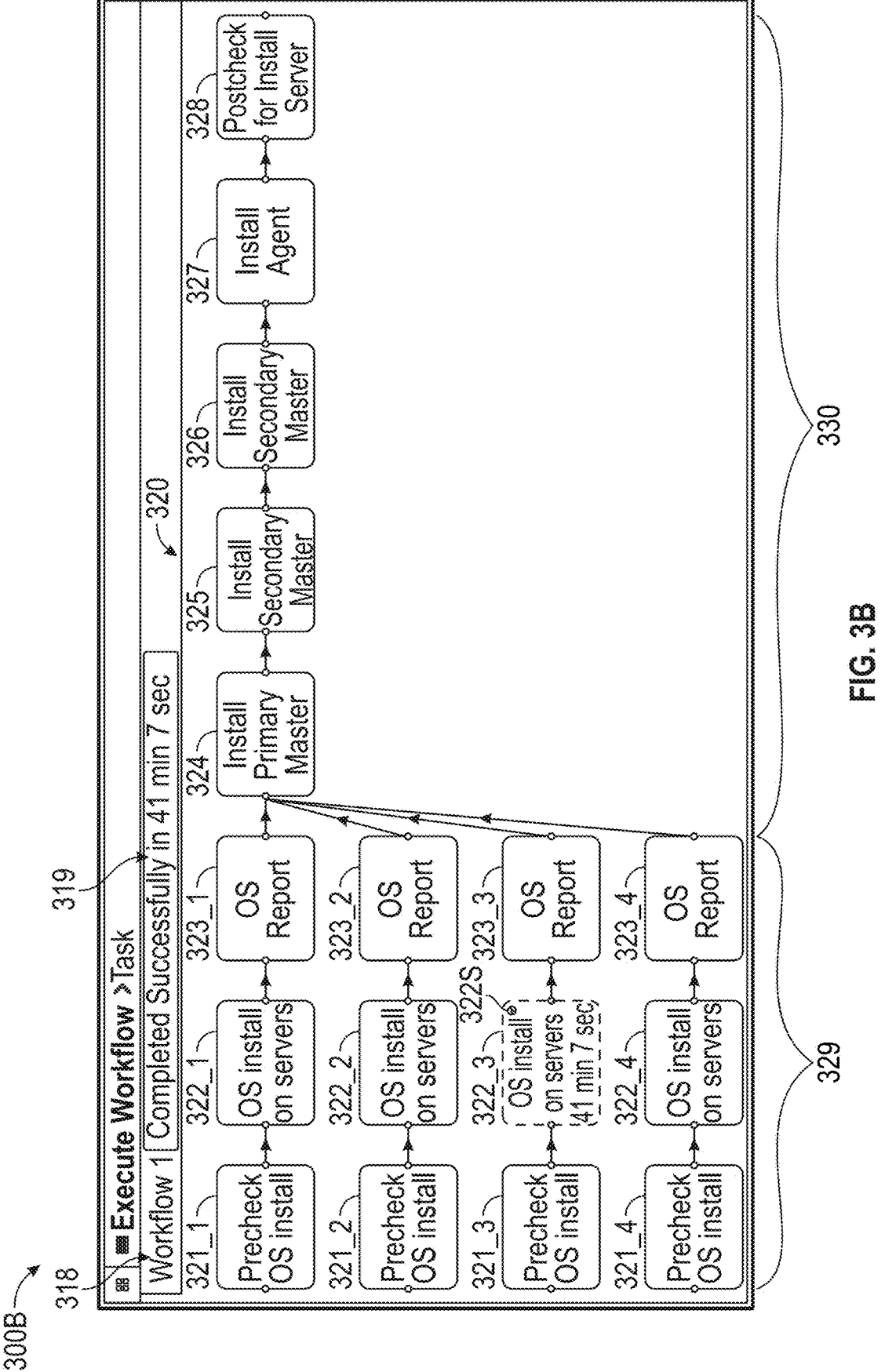

Upon user selection of a workflow from the list in a screen 300B described with respect to FIG. 3B is displayed, and gives the user further options, such as viewing details of the workflow including a step-by-step view of each task in the workflow, the time taken to complete a task, status of a task. Further options include permitting the user to re-run the workflow, for example, where the workflow execution fails for any element, viewing configurations of a task. An example rerun option is described with respect to FIGS. 3C, 3D.

From the list in the screen 300A, the user is given the option to execute a workflow on the list, by selecting the element and recommended workflow, and operating the button 310. By operating the button 310A, the list of executed workflows is updated to obtain an updated list. The button 310B permits the user to filter the list of executed workflows based on status and/or start date.

FIG. 3B is a schematic diagram of the screen 300B of the UI, in accordance with some embodiments. In some embodiments, the screen 300B is displayed upon user selection of an executed workflow from the list in screen 300A.

The screen 300B includes a visually presentation of the selected workflow 320 which includes a plurality of tasks arranged and/or connected together on a sequence from the start at four tasks 321_1~321_4 to completion at task 328. The workflow 320 is an example workflow for an OS installation process 329 at four nodes, following by a cluster installation process 330 to configure the four nodes into a cluster. Examples of nodes and clusters are described with respect to FIG. 1.

In the OS installation process 329, the same series of three tasks is executed at each node. For example, for the first node (the first or top row), tasks 321_1, 322_1, 323_1 are sequentially executed at the first node, for example, under control of one or more worker pods as described with respect to FIG. 1. In some embodiments, a subsequent task, e.g., task 322_1 or 323_1, is executed upon completion of the preceding task, e.g., task 321_1, 322_1. Similarly, for the second node (the second row), tasks 321_2, 322_2, 323_2 are sequentially executed at the second node. For the third node (the third row), tasks 321_3, 322_3, 323_3 are sequentially executed at the third node. For the fourth node (the bottom row), tasks 321_4, 322_4, 323_4 are sequentially executed at the fourth node. Tasks 321_1~321_4 for prechecking before OS installation are identical and are commonly referred to as task 321. Tasks 322_1~322_4 for OS installation are identical and are commonly referred to as task 322. Tasks 323_1~323_4 for OS report are identical and are commonly referred to as task 323. In some embodiments, tasks 323_1~323_4 are omitted.

In some embodiments, the cluster installation process 330 may begin upon completion of the OS installation process 329, i.e., upon successful completion of all four tasks 322_1~322_4 (or upon successful completion of all four tasks 322_1~322_4 when tasks 323_1~323_4 are omitted. Tasks 324-328 are sequentially executed. In an example, task 324 for installing a Primary Master (PM) is executed at one node, tasks 325-326 for installing a Secondary Master (SM) are executed at least at one node different from the PM node, and task 327 for installing at least one Agent is executed at least at one further node different from the PM and SM nodes. Task 328 for post-checking is the last task of the workflow 320.

In some embodiments, the workflow 320 is a dynamic workflow. A workflow configuration corresponding to the workflow 320 includes one series of tasks 321, 322, 323 for the OS installation process 329. The other three series of tasks 321, 322, 323 are not included in the workflow configuration. When the workflow configuration is selected to be executed for a group of four nodes, the system automatically generates the three additional series of tasks so that each node has its own series of tasks 321, 322, 323. When the workflow configuration is selected to be executed for a group of a different number of nodes, e.g., ten nodes, the system will automatically generate nine additional series of tasks so that each of the ten nodes has its own series of tasks 321, 322, 323.

The screen 300B further includes indicators 318, 319. The indicator 318 indicates the workflow name of the workflow 320. The indicator 319 indicates the status and the time taken to complete a task selected by the user in the workflow 320. In the example configuration in FIG. 3B, task 322_3 is selected, and its status "Completed Successfully" and the time taken to complete "41 min 7 see" are reflected in the indicator 319. The status "Completed Successfully" is reflected at selected task 322_3 in the workflow 320 by visually presenting the completed (or success) task 322_3 in a format visually distinctive from a format in which other non-success tasks are visually presented. For example, the success task 322_3 is visually presented with the color green, whereas other non-success tasks are visually presented with other colors. Another feature of the distinctive format of the success task 322_3 is that it includes a checkmark sign 322S that other non-success tasks do not have. The described distinctive formats are examples. Other format schemes are within the scopes of various embodiments. For example, visually distinctive formats may have different degrees of transparency, may be blinking or otherwise animated, may be with or without shadows, may have different font types, font colors and/or font variations (e.g., bold or italicized text), may have different icons and/or text added, may have different combinations of the above visual effects and/or other effects not specifically described herein.

Figure 3C:
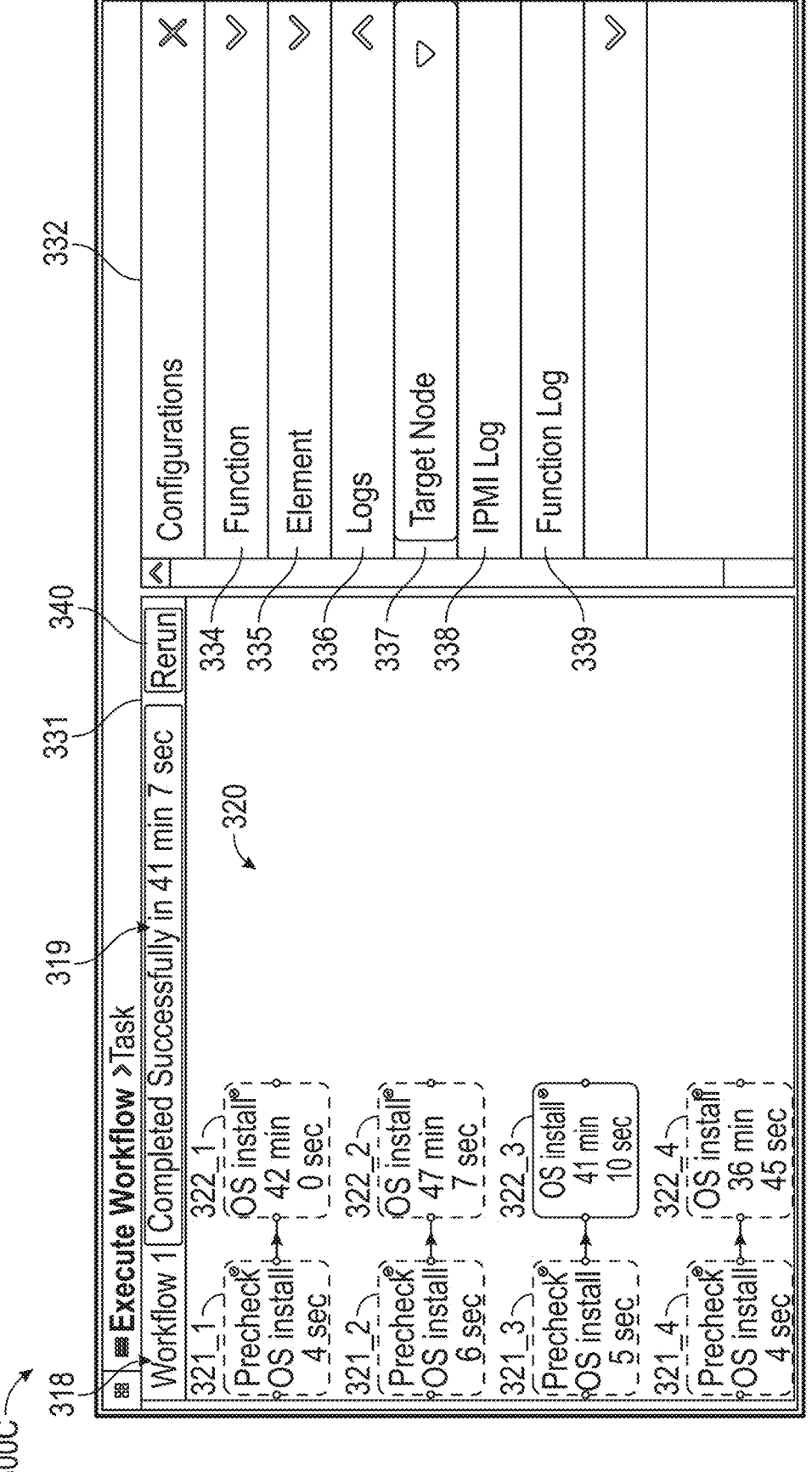

FIG. 3C is a schematic diagram of the screen 300C of the UI, in accordance with some embodiments. In some embodiments, the screen 300C is displayed in response to user operation to further view details of a selected task. For example, when the user double-clicks on the selected task 322_3 in the screen 300B, the screen 300C is caused to be displayed.

The screen 300C includes a display area 331 showing an enlarged and partial view of the portion of the workflow 320 where the selected task 322_3 is located. The screen 300C further comprises a display area 332 where details of the selected task 322_3 are shown. For example, a function drop-down 334, when selected, will show one or more functions associated with the selected task, i.e., one or more functions that are executed during the execution of the selected task. An element drop-down 335, when selected, will show one or more elements associated with the selected task. A log drop-down 336, which is already in the selected state in the screen 300C, shows log names of the available logs, i.e., an IPMI log 338 and a function log 339, for a target node, i.e., the node at which the selected task 322_3 is executed. The target node is shown at a drop-down 337. When a different target node is selected from the drop-down 337, different log names of the corresponding available logs are shown. In some embodiments, depending on one specifics of the workflow and/or the element where the workflow is executed, at least one of the IPMI log or function log is not available at a target node.

The screen 300C further comprises an input area, e.g., a re-run button 340, for receiving user input to re-run the execution of the workflow. In at least one embodiment, it is possible for the user to re-run the workflow without reviewing the log information.

Figure 3D:
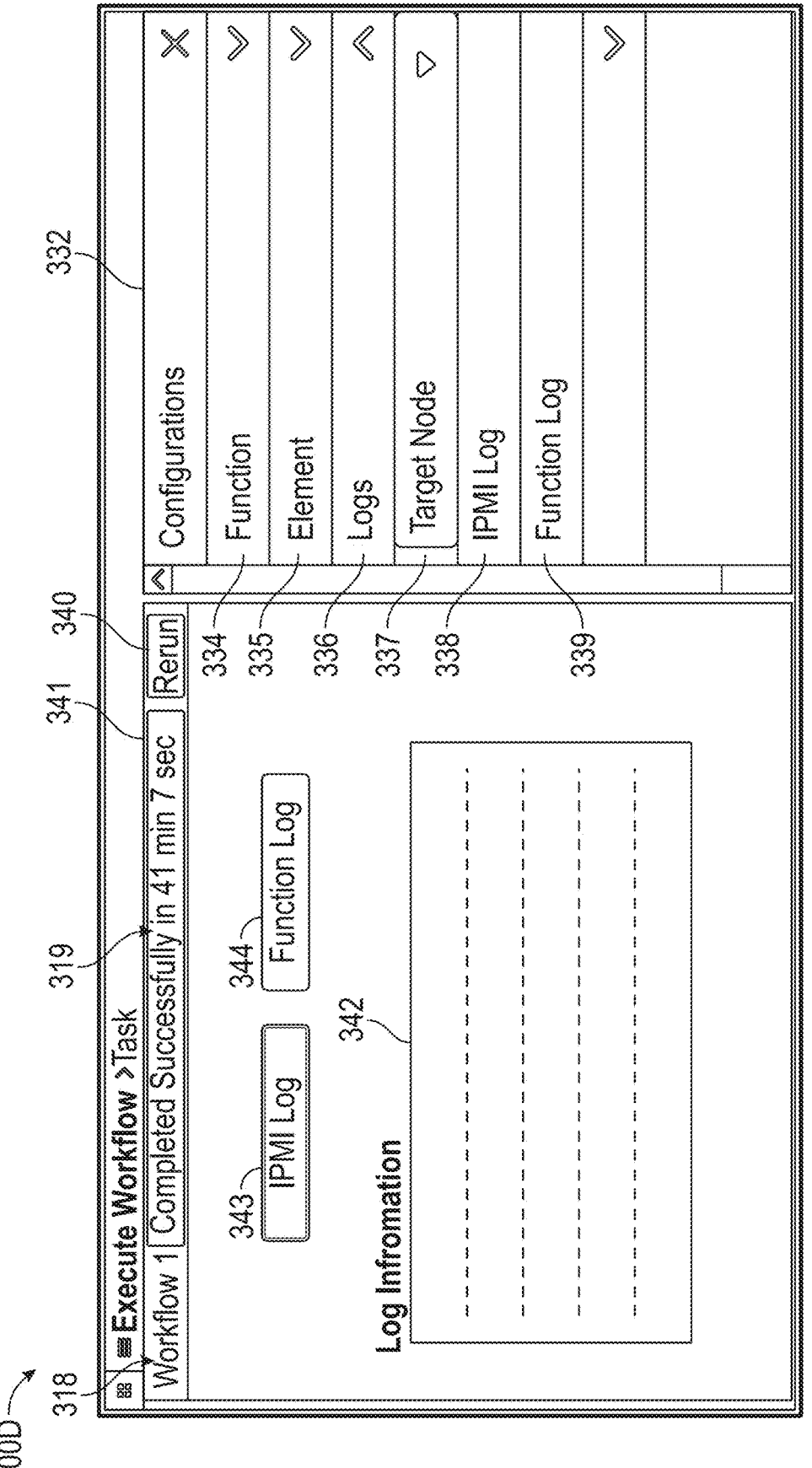

FIG. 3D is a schematic diagram of a screen 300D of the UI, in accordance with some embodiments. In some embodiments, the screen 300D is displayed in response to user selection of either the IPMI log 338 or the function log 339 in the display area 332. For example, when the user selects the IPMI log 338 in the display area 332, the display area 331 with a partial view of the workflow 320 in the screen 300C is replaced with a display area 341 in the screen 300D.

The display area 341 includes a button 343 with the log name of the IPMI log 338, a button 344 with the log name of the function log 339, and a log information display area 342 in which detailed log information of the selected log is displayed. For example, when the user selects the IPMI log 338 in the display area 332, the button 343 is displayed as being selected, and the log information display area 342 shows the detailed log information of the IPMI log 338. When the user selects either the function log 339 in the display area 332 or the button 344, the detailed log information of the function log 339 is displayed in the log information display area 342. The screen 300D still includes the re-run button 340.

In some embodiments, the IPMI log 338 is a log specific to OS installation which is generated on the target node during the OS installation process. For example, during the OS installation process 329 in FIG. 3B, four different IPMI logs are generated correspondingly at the four nodes at which the OS installation process 329 is executed. In at least one embodiment, during the OS installation process, a worker pod establishes a serial over LAN (SOL) session with the target node to obtain the IPMI log there from. The obtained IPMI log is then redirected by the worker pod to a log storage as described with respect to FIGS. 1 and 5. When the user selects the IPMI log 338 in the display area 332, or operates the button 343 in the display area 341, the detailed log information of the IPMI log of the target node is retrieved from the log storage and displayed in the log information display area 342. In at least one embodiment, the displayed log information is retrieved and/or updated in real time.

In some embodiments, the function log 339 is a log generated by one or more functions or scripts associated with the currently selected task. For example, the selected task 322_3 for OS installation is associated with one or more functions or scripts which are executed to perform the OS installation indicated by the selected task. The executed one or more functions or scripts generate log information to be included in the function log and provided to the corresponding worker pod. The worker pod redirects the function log to the log storage. When the user selects the function log 339 in the display area 332, or operates the button 344 in the display area 341, the detailed log information of the function log of the target node is retrieved from the log storage and displayed in the log information display area 342. In at least one embodiment, the displayed log information is retrieved and/or updated in real time.

In some embodiments, when the log information displayed in the log information display area 342 indicates an error and/or a potential issue, it is possible for the user to rerun the workflow by operating the re-run button 340.

In some embodiments, the described arrangement for log redirection and retrieval upon request and/or in real time provides one or more advantages over other approaches.

Specifically, a server is often located in a datacenter/building/site. In accordance with other approaches, a dedicated engineering team is going from site to site to install software, e.g., an OS, in a BM to be configured as a server. This is a manual and time-consuming process. Further, after the OS is installed, the engineering team needs to obtain a permit to get access at node level. In some situations, it may take a week or longer to obtain an appropriate service level agreement (SLA) permit. After gaining the required access, the engineering team needs to run scripts manually to install a Robin cluster. If there is any issue during execution, logs are getting displayed after execution. The engineering team needs to spend time to travel to the site to obtain log information and/or investigate which is causing the delay in whole process.

The above issues of the other approaches are avoidable in a workflow management system 100 in accordance with some embodiments. In at least one embodiment, real time logs are available upon request from a remote location, and are viewable while the workflow is still being executed. As a result the user does not need to wait until the workflow execution is completed, or travel to the site for collecting and reviewing relevant log information. One or more embodiments provide one or more advantages including, but not limited to, reduced manual errors, improved performance, reduced cost. In terms of performance, it may take several days for an engineering team to complete an OS and cluster installation workflow (e.g., the workflow 320) in accordance with the manual process of the other approaches. In contrast, it is possible in some embodiments to create over 50 clusters in parallel, within 2 to 3 hours.

Figure 3E:
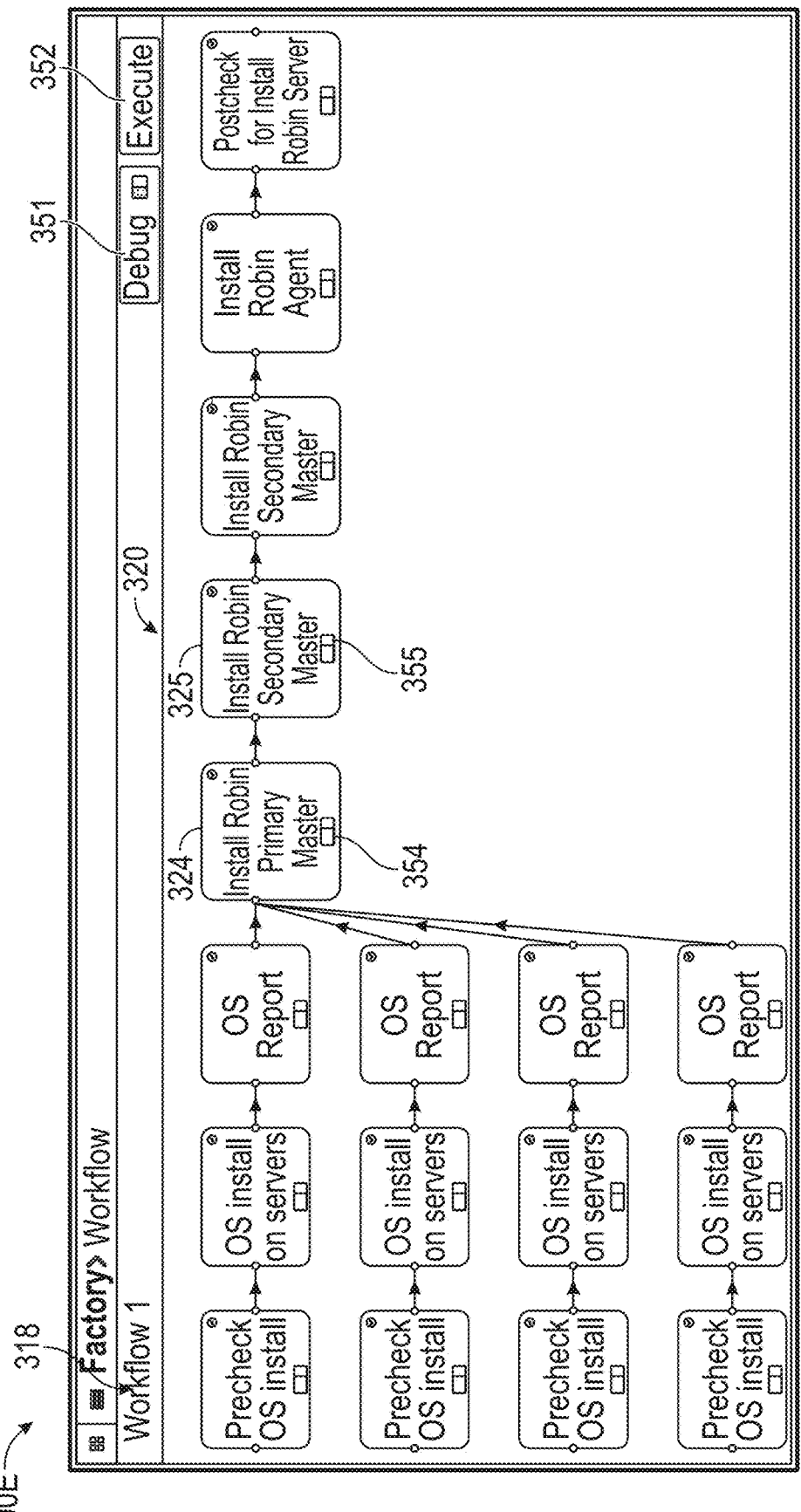

FIG. 3E is a schematic diagram of a screen 300E of the UI, in accordance with some embodiments. In some embodiments, the screen 300E is displayed when the user selects the Factory sub-menu item 244 in screen 200B to reach a list of workflows managed by the workflow management system 100, and then selects a workflow, e.g., the workflow 320, from the list.

The screen 300E includes the workflow 320 described with respect to FIG. 3B, an input area, e.g., a toggle button 351, for receiving user input whether to enable or disable a debug mode, and a button 352 for causing execution of the workflow 320. In the screen 300E, the toggle button 351 is in a state corresponding to the debug mode being enabled. In response to the debug mode being enable, each task in the workflow 320 is displayed with another input area, e.g., toggle buttons 354, 355 correspondingly associated with tasks 324, 325. Other tasks of the workflow 320 also include corresponding toggle buttons, which are not numbered for simplicity. The toggle buttons, including buttons 354, 355, are configured for receiving user selection whether the corresponding tasks are to be included for execution in the debug mode.

Figure 3F:
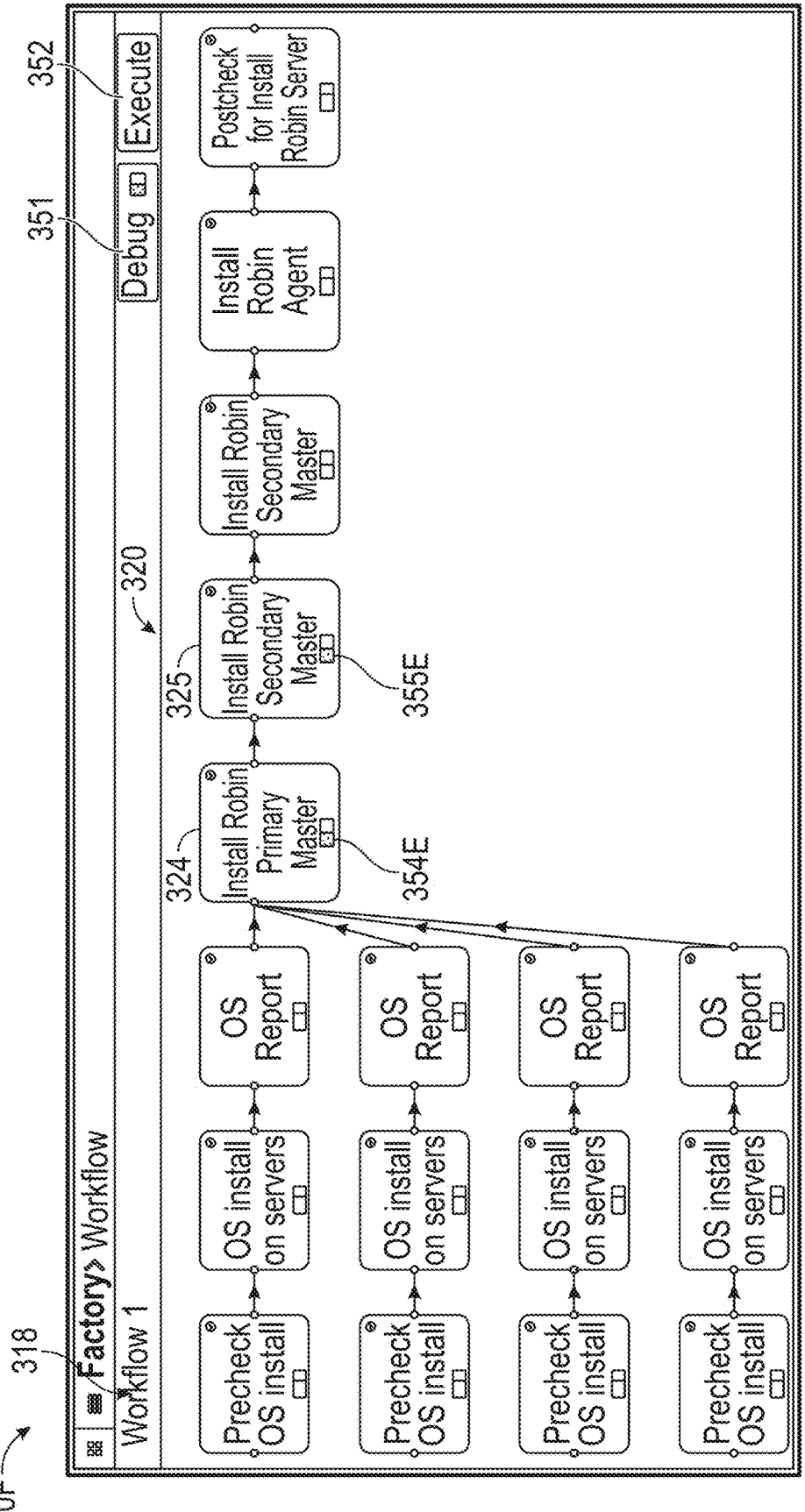

FIG. 3F is a schematic diagram of a screen 300F of the UI, in accordance with some embodiments. The screen 300F is a version of the screen 300E in response to user operation of the toggle buttons 354, 355 associated with tasks 324, 325 in the user interface 200. The operated toggle buttons 354, 355 are switched to a different state which is schematically indicated as 354E, 355E in the screen 300F, and which indicates that the corresponding tasks 324, 325 are selected to be included for execution in the debug mode. Upon user operation of the button 352, only the tasks selected by the corresponding toggle buttons for execution in the debug mode are executed, whereas the remaining, unselected tasks are not executed in the debug mode. For example, in the state illustrated in FIG. 3E, upon user operation of the button

352, only tasks 324, 325, which are selected to be included for execution in the debug mode by user operation of the corresponding toggle buttons 354, 355, will be executed, whereas the remaining tasks unselected to be included in the debug mode will not be executed. In some embodiments, the debug mode as described herein permits a user to execute only selected tasks, rather than the whole workflow, thereby reducing the workflow execution time and/or expediting the debugging process.

Further, although the process is referred to as debugging, in at least one embodiment, it is not necessary to use this process for isolating or solving an issue. Rather, there are situations where only a few tasks, instead of all tasks, in the workflow are to be executed. By using the debugging process described with respect to FIGS. 3E-3F, it is possible for a user to select and execute the desired tasks, without having to execute the whole workflow.

A toggle button associated with a task has a selected state (e.g., 354E, 355E in the screen 300F) and a unselected state (e.g., other toggle buttons in the screen 300F, or all toggle buttons in the screen 300E). In the example configuration in FIGS. 3E-3F, the selected state is presented in a format visually distinctive from a format of the unselected state. For example, toggle buttons in the selected state are displayed with a color (e.g., red) different from a color (e.g., gray) of the toggle buttons in the unselected state. In some embodiments, other format schemes with visually distinctive formats are within the scopes of various embodiments. In at least one embodiment, by showing the selected and unselected tasks for the debug mode in visually distinctive formats, it is possible to avoid or reduce human errors due to a user selecting a wrong task to be included in execution in the debug mode. The described toggle buttons are examples. Other configurations for receiving user input are within the scopes of various embodiments. Examples of alternatives to toggle buttons include, but are not limited to, a switch, a radio button, a menu (e.g., a drop-down menu) or the like.

Although not illustrated in the drawings, when the toggle button 351 is in a state corresponding to the debug mode being disabled, the toggle buttons, such as buttons 354, 355, are not displayed in the tasks of the workflow 320. At this state, upon user operation of the button 352, the whole workflow 320 will be executed as normal. The state of the executed workflow 320, whether in the debug mode or not, is provided in the screen 300A.

Figure 3G:
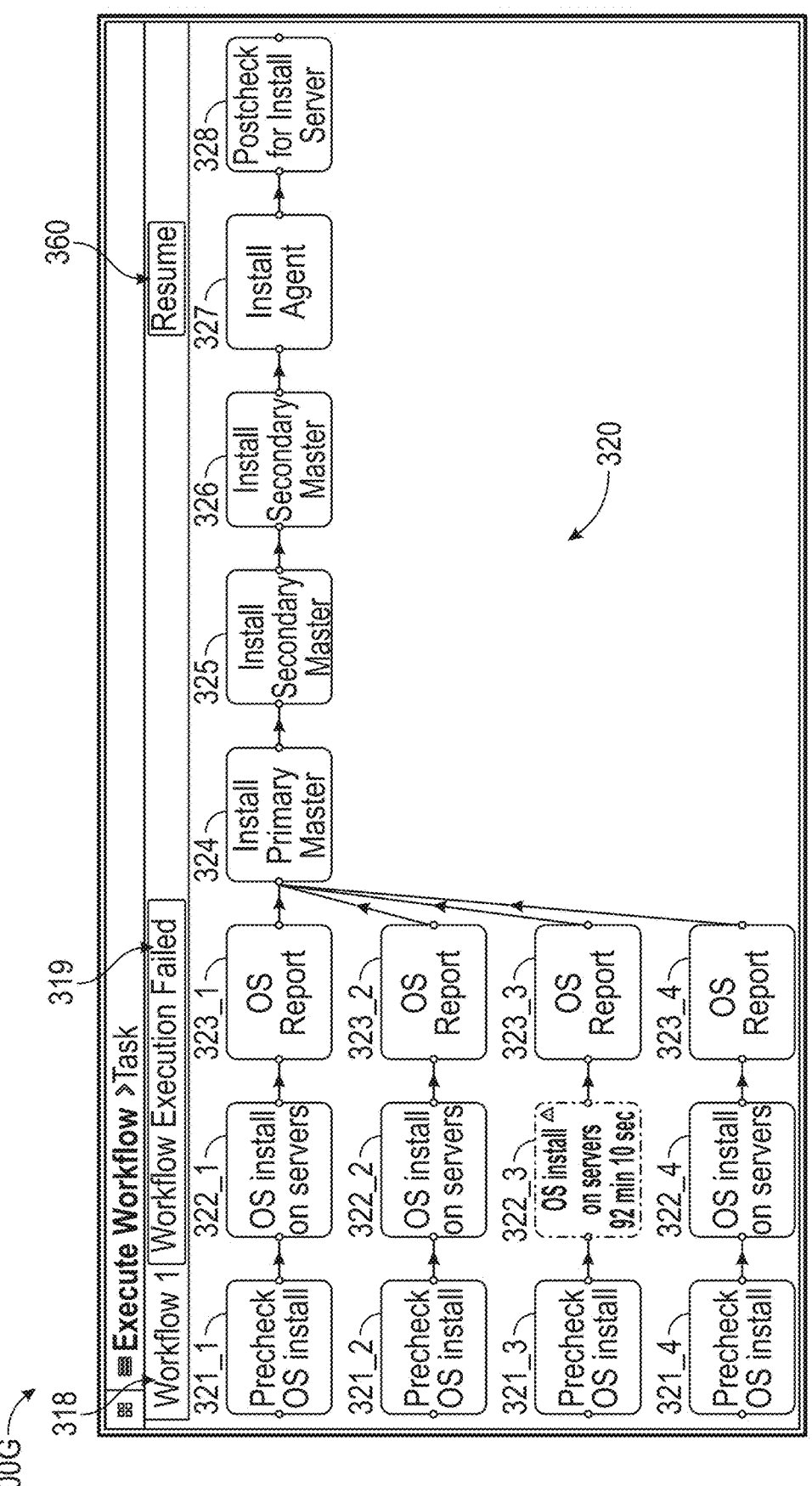

FIG. 3G is a schematic diagram of a screen 300G of the UI, in accordance with some embodiments. In some embodiments, the screen 300G is displayed upon user selection of a workflow from a list of executed workflows ion the screen 300A.

In the example configuration in FIG. 3G, the same workflow 320 as in the screen 300B is displayed in the screen 300G. A difference between the screen 300G and screen 300B is that the workflow 320 in the screen 300B is successfully completed, whereas in the screen 300, the workflow execution failed, as shown at the indicator 319. A failed task where the workflow execution failed is visually presented in a format distinctive from the other tasks. For example, in the screen 300G, the failed task is task 322_3 which is displayed in a color (e.g., red) different from other tasks. In response to the workflow execution has a failed task, the system includes a button 360 for providing the user with a plurality of options for resuming the failed workflow.

Figure 3H:
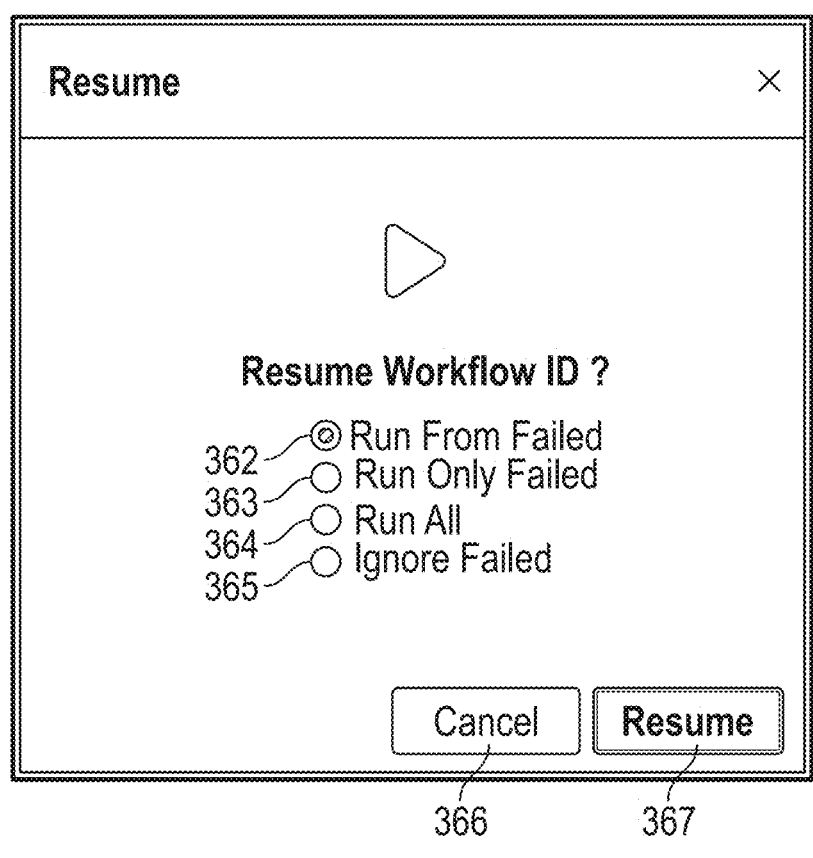

FIG. 3H is a schematic diagram of a screen 300H of the UI, in accordance with some embodiments. In some embodiments, the screen 300H is displayed, over or in place of the screen 300G, upon user operation of the button 360 in the screen 300G.

The screen 300H includes a plurality of selectable different resume options 362-365 for resuming the execution of the workflow 320. The screen 300H further comprises a button 366 to cancel and return to the screen 300G, and a button 367 to resume the execution of the workflow 320 in accordance with a selected resume options among the resume options 362-365.

In response to user selection of the resume option 362, i.e., Run from Failed, and subsequent user operation of the button 367, the workflow 320 will be executed from the failed task. In others words, the failed task, and tasks subsequent to the failed task, will be executed in this option.

In response to user selection of the resume option 363, i.e., Run only Failed, and subsequent user operation of the button 367, only the failed task of the workflow 320 will be executed, whereas other tasks in the workflow 320, including the tasks subsequent to the failed task, will not be executed.

In response to user selection of the resume option 364, i.e., Run All, and subsequent user operation of the button 367, the whole workflow 320 will be executed from the beginning. In at least one embodiment, this option is similar to the rerun option described with respect to FIGS. 3C-3D.

In response to user selection of the resume option 365, i.e., Ignored Failed, and subsequent user operation of the button 367, the failed task will be ignored, and the tasks subsequent to the failed task will be executed in this option In some embodiments, the provision of several different resume options provide the user with flexibility in addressing or resolving issues related to a failed workflow execution. One or more of the resume options reduce the number of tasks to be executed, thereby reducing the workflow execution time.

Figure 4:
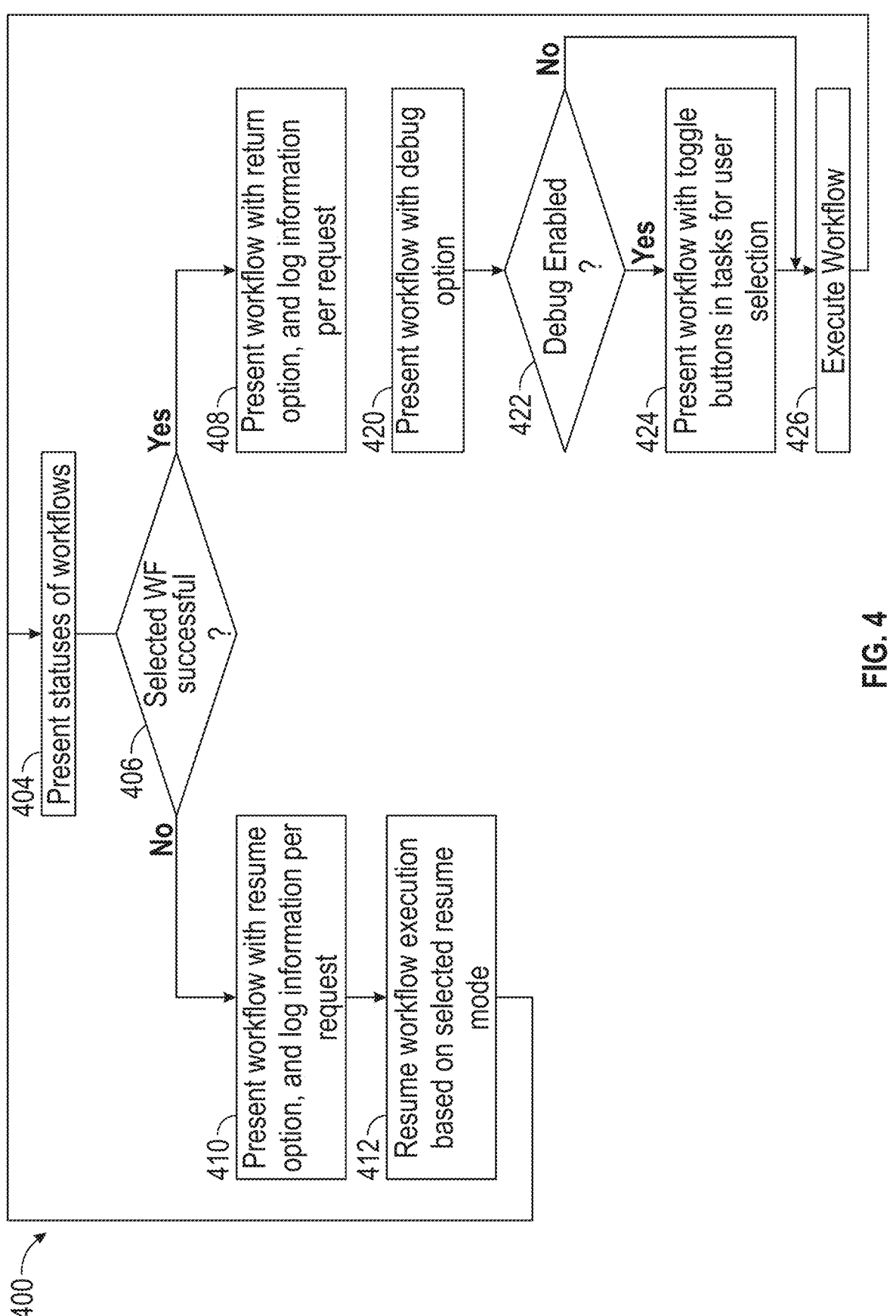
FIG. 4 is a flow chart of an example UI user flow in a workflow management system, in accordance with some embodiments.

FIG. 4 is a flow chart of an example UI user flow 400 in a workflow management system, in accordance with some embodiments. In some embodiments, the UI user flow 400 corresponds to one or more operations in the workflow management system 100, in accordance with some embodiments.

At operation 404, the screen 300A is displayed to show present statuses of the executed workflows. In at least one embodiment, the screen 300A is displayed in response to user selection of the Execute Workflow sub-menu item 246 in the screen 200B, and/or when the user instructs execution of a workflow.

At operation 406, the system determines whether an executed workflow selected from the list in FIG. 3A is a successful workflow.

At operation 408, in response to a positive determination (Yes) at operation 406, the selected workflow is displayed with a rerun option, as in the screen 300C.

At operation 410, in response to a negative determination (No) at operation 406, the selected workflow is displayed with a resume button 360 as in the screen 300G. Upon user operation of the button 360, the screen 300H is displayed with a plurality of different resume options for user selection.

At operation 412, in response to user input, the workflow is resumed based on a resume option selected from the screen 300H. The process then returns to the screen 300A at operation 404 to show an updated list of executed workflows.

At operation 420, a selected workflow is displayed with an option, e.g., the toggle button 351 in the screen 300E, to enable or disable a debug mode.

At operation 422, the system determines whether the debug mode is enabled.

At operation 424, in response to a positive determination (Yes) at operation 422, the workflow is displayed with toggle buttons each associated with a corresponding task for user selection of a task or tasks to be included for execution in the debug mode.

At operation 426, the workflow is executed either as normal with all tasks (No from operation 422), or with selected tasks in the debug mode. The process then returns to the screen 300A at operation 404 to show an updated list of executed workflows.

Figure 5:
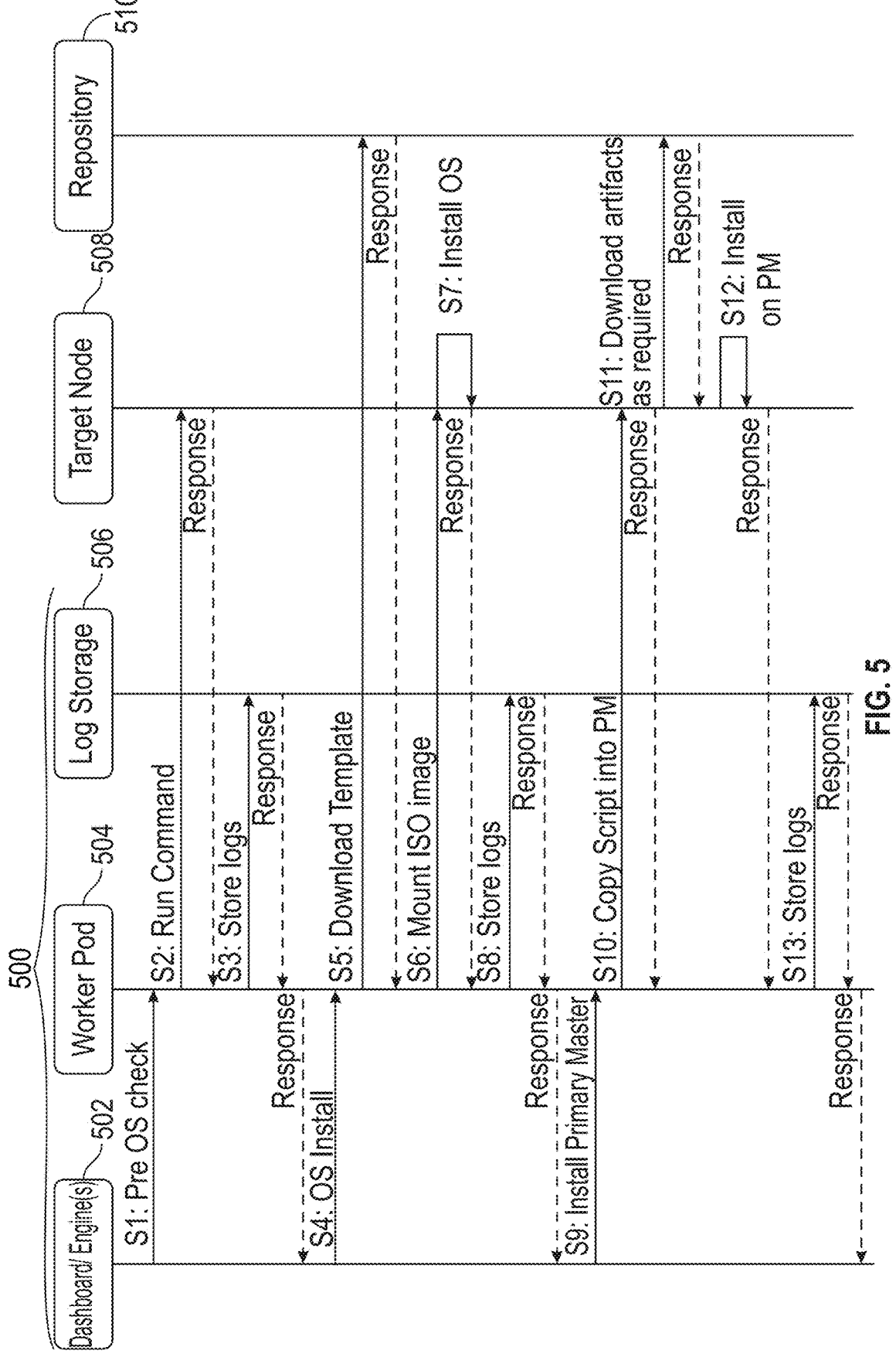
FIG. 5 is a time flow chart of an example workflow execution managed by a workflow management system, in accordance with some embodiments.

FIG. 5 is a time flow chart of an example workflow execution managed by a workflow management system 500, in accordance with some embodiments. In some embodiments, the workflow management system 500 corresponds to the workflow management system 100. The workflow management system 500 comprises a Dashboard/Engine(s) 502 corresponding to one or more modules of the dashboard microservice 110 and/or one or more engines of the engines 120, at least one worker pod 504 corresponding one or more worker pods 128, and a log storage 506 corresponding to the log storage 140. A target node 508 is where the workflow is executed. A repository 510 corresponds to the repository 150. In the example in FIG. 5, the workflow being executed corresponds to the workflow 320. For simplicity several tasks of the workflow 320 are omitted.

At step S1, the Dashboard/Engine(s) 502 instructs the worker pod 504 to perform a pre OS check corresponding to task 321_1 in FIG. 3B.

At step S2, the Dashboard/Engine(s) 502 executes, on the target node 508, a command or function corresponding to the pre OS check task. Log information is sent from the target node 508 and/or generated at the worker pod 504.

At step S3, the worker pod 504 redirects the log information collected during execution of the pre OS check task 321_1 to the log storage 506.

At step S4, the Dashboard/Engine(s) 502 instructs the worker pod 504 to perform OS installation corresponding to task 322_1 in FIG. 3B.

At step S5, the Dashboard/Engine(s) 502 downloads a template and/or necessary information and/or data from the repository 510.

At step S6, the Dashboard/Engine(s) 502 mounts an ISO image on the target node 508.

At step S7, an OS installation is performed at the target node 508 based on the ISO image. Log information, including IPMI logs, is sent from the target node 508 to the worker pod 504.

At step S8, the worker pod 504 redirects the log information collected during execution of the OS installation task 322_1 to the log storage 506. For simplicity, a few tasks subsequent to task 322_1 are omitted in FIG. 5.

At step S9, the Dashboard/Engine(s) 502 instructs the worker pod 504 to install Primary Master (PM) which corresponds to task 324 in FIG. 3B.

At step S10, the worker pod 504 copies a script into target node 508 to be installed as a PM.

At step S11, the target node 508 downloads artifacts as/if necessary from the repository 510.

At step S12, the target node 508 performs PM installation based on the downloaded artifacts. Log information is sent from the target node 508 to the worker pod 504.

At step S13, the worker pod 504 redirects the log information collected during execution of the PM installation task 324 to the log storage 506. The log information in the log storage 506 is retrieved and provided upon request and in real time to the user.

FIG. 6A is a flow chart of a process 600A in a workflow management system, in accordance with some embodiments. In some embodiments, the process 600A is performed in the workflow management system 100.

At operation 602, a workflow comprising a plurality of tasks is executed in accordance with a sequence of the plurality of tasks in the workflow, for example, as described with respect to FIGS. 3B and 5.

At operation 604, log information related to the plurality of tasks during the execution of the workflow is redirected to be stored in a log storage, for example, as described with respect to FIG. 5, at S3, S8, S13.

At operation 606, the workflow comprising the plurality of tasks arranged in the sequence is visually presented, for example, as described with respect to FIG. 3B.

At operation 608, in response to user selection of a task among the plurality of tasks of the workflow, task information related to the selected task is visually presented, for example, as described with respect to FIG. 3C.

At operation 610, in response to user selection of a log in the visually presented task information, the log information related to the selected task is retrieved from the log storage, and the retrieved log information is visually presented, for example, as described with respect to FIG. 3D.

FIG. 6B is a flow chart of a process 600B in a workflow management system, in accordance with some embodiments. In some embodiments, the process 600B is performed in the workflow management system 100.

At operation 622, a workflow comprising a plurality of tasks arranged in a sequence is visually presented, for example, as described with respect to FIG. 3E.

At operation 624, for each task of the plurality of tasks of the workflow, a first input area is visually presented for receiving user selection whether the task is to be included in a debug mode, for example, as described with respect to FIG. 3E.

At operation 626, among the plurality of tasks, one or more tasks selected to be included in the debug mode are executed, without executing remaining one or more tasks not selected to be included in the debug mode, for example, as described with respect to FIG. 3F.

FIG. 6C is a flow chart of a process 600C in a workflow management system, in accordance with some embodiments. In some embodiments, the process 600C is performed in the workflow management system 100.

At operation 642, a workflow comprising a plurality of tasks is executed, in accordance with a sequence of the plurality of tasks in the workflow, for example, as described with respect to FIG. 3G.

At operation 644, among the plurality of tasks, for a task that failed in the execution of the workflow, user selection is received for a resume option among a plurality of different resume options for resuming the execution of the workflow, for example, as described with respect to FIG. 3H.

At operation 646, the execution of the workflow is resumed in accordance with the selected resume option, as described with respect to FIG. 3H.

The described methods and algorithms include example operations, but they are not necessarily required to be performed in the order shown. Operations may be added, replaced, changed order, and/or eliminated as appropriate, in accordance with the spirit and scope of embodiments of the disclosure. Embodiments that combine different features and/or different embodiments are within the scope of the disclosure and will be apparent to those of ordinary skill in the art after reviewing this disclosure.

FIG. 7 is a schematic block diagram of a computer system 700, in accordance with some embodiments. Examples of the computer system 700 include, but are not limited to, desktop, a laptop, a tablet, a smart phone, a server, or the like.

The computer system 700 includes a hardware processor 702 and a non-transitory, computer-readable storage medium 704. Storage medium 704, amongst other things, is encoded with, i.e., stores, computer program code 706, i.e., a set of executable instructions, such as one or more algorithms, programs, applications, sets of executable instructions for a system, component, and/or module, as described with respect to one or more of FIGS. 1-4. Execution of instructions 706 by hardware processor 702 implements a portion or all of the methods described herein in accordance with one or more embodiments (hereinafter, the noted processes and/or methods).

Processor 702 is coupled to non-transitory computer-readable storage medium 704 via a bus 708. Processor 702 is also coupled to an I/O interface 710 by bus 708. A network interface 712 is connected to processor 702 via bus 708. Network interface 712 is connected to a network 714, so that processor 702 and computer-readable storage medium 704 are connectable to external elements or devices via network 714. Processor 702 is configured to execute computer program code 706 encoded in computer-readable storage medium 704 in order to cause computer system 700 to be usable for performing a portion or all of the noted processes and/or methods. In one or more embodiments, processor 702 comprises a central processing unit (CPU), a multi-processor, a distributed processing system, an application specific integrated circuit (ASIC), and/or a suitable hardware processing unit.

In one or more embodiments, computer-readable storage medium 704 comprises an electronic, magnetic, optical, electromagnetic, infrared, and/or a semiconductor system (or apparatus or device). For example, computer-readable storage medium 704 includes a semiconductor or solid-state memory, a magnetic tape, a removable computer diskette, a random access memory (RAM), a read-only memory (ROM), a rigid magnetic disk, and/or an optical disk. In one or more embodiments using optical disks, computer-readable storage medium 704 includes a compact disk-read only memory (CD-ROM), a compact disk-read/write (CD-R/W), and/or a digital video disc (DVD).

In one or more embodiments, storage medium 704 stores computer program code 706 configured to cause computer system 700 to be usable for performing a portion or all of the noted processes and/or methods. In one or more embodiments, storage medium 704 also stores information or data 707, such as event data, consumer data, business data, policies, component configurations or the like, used in a portion or all of the noted processes and/or methods.

I/O interface 710 is coupled to external circuitry. In one or more embodiments, I/O interface 710 includes a keyboard, keypad, mouse, trackball, trackpad, touchscreen, and/or cursor direction keys for communicating information and commands to processor 702. Computer system 700 is configured to receive information through I/O interface 710. The information received through I/O interface 710 includes one or more of instructions, data, policies, configurations and/or other parameters for processing by processor 702. The information is transferred to processor 702 via bus 708.

Computer system 700 is configured to receive information related to a user interface through I/O interface 710. The information is stored in computer-readable storage medium 704 as user interface (UI) 742.

Network interface 712 allows computer system 700 to communicate with network 714, to which one or more other computer systems are connected. Network interface 712 includes wireless network interfaces such as BLUETOOTH, WIFI, WIMAX, GPRS, LTE, 7G, 6G, WCDMA, or the like; or wired network interfaces such as ETHERNET, USB, IEEE-864 or the like. In one or more embodiments, a portion or all of noted processes and/or methods, is implemented in two or more computer system 700.

In some embodiments, a portion or all of the noted processes and/or methods is implemented as a standalone software application for execution by one or more hardware processors. In some embodiments, a portion or all of the noted processes and/or methods is implemented as a software application that is a part of an additional software application. In some embodiments, a portion or all of the noted processes and/or methods is implemented as a plug-in to a software application.

In some embodiments, a portion or all of the noted processes and/or methods is realized as functions of a program stored in a non-transitory computer readable recording medium. The non-transitory computer readable recording medium having the program stored therein is a computer program product. Examples of a non-transitory computer-readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, or the like.

The foregoing outlines features of several embodiments so that those skilled in the art better understand the aspects of the present disclosure. Those skilled in the art should appreciate that they readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they make various changes, substitutions, and alterations herein without departing from the spirit and scope of the present disclosure.

What is claimed is:

1. A workflow management system, comprising:

at least one processor; and at least one computer readable storage medium coupled to the at least one processor and configured to store executable instructions that, when executed by the at least one processor, instruct the at least one processor to:

execute a workflow comprising a plurality of tasks, in accordance with a sequence of the plurality of tasks in the workflow;

store log information related to the plurality of tasks during the execution of the workflow in a log storage;

in response to a user request, visually present the workflow comprising the plurality of tasks arranged in the sequence;

in response to a user selection of a task among the plurality of tasks of the workflow, visually present task information related to the selected task; and in response to a user request for log information of the selected task, retrieve the log information related to the selected task from the log storage, and visually present the retrieved log information, wherein the executable instructions, when executed by the at least one processor, instruct the at least one processor to cause at least one worker pod to:

control Operating System (OS) installation of an OS at each node of a plurality of nodes, wherein the OS installation at each node of the plurality of nodes corresponds to a task among the plurality of tasks; and control cluster installation of a primary master, a secondary master and at least one agent among the plurality of nodes, wherein the cluster installation of each of the primary master, the secondary master and the at least one agent corresponds to a further task among the plurality of tasks.

2. The workflow management system of claim 1, wherein the executable instructions, when executed by the at least one processor, instruct the at least one processor to:

cause the at least one worker pod to redirect the log information received from the plurality of nodes to the log storage to be stored at the log storage.

3. The workflow management system of claim 1, wherein the executable instructions, when executed by the at least one processor, instruct the at least one processor to:

retrieve and visually present the log information related to the selected task in real time.

4. The workflow management system of claim 1, wherein the retrieved and visually presented log information comprises at least one of:

an Intelligent Platform Management Interface (IPMI) log generated by the OS installation, or a function log generated by execution of a function script.

5. The workflow management system of claim 1, wherein the executable instructions, when executed by the at least one processor, instruct the at least one processor to cause at least one worker pod to:

redirect an Intelligent Platform Management Interface (IPMI) log, which is generated by the OS installation at each node of the plurality of nodes, to the log storage to be stored at the log storage as the log information related to the OS installation; and redirect a function log, which is generated by a function script executed during the cluster installation of each of the primary master, the secondary master and the at least one agent, to the log storage to be stored at the log storage as the log information related to the cluster installation.

6. The workflow management system of claim 1, wherein the executable instructions, when executed by the at least one processor, instruct the at least one processor to:

visually present a first input area for receiving user input whether to enable or disable a debug mode; and in response to receiving the user input to enable the debug mode, visually present, for each task of the plurality of tasks of the workflow, a second input area for receiving user selection whether the task is to be included in the debug mode; and among the plurality of tasks, cause execution of one or more tasks selected to be included in the debug mode, while excluding execution of unselected tasks in the debug mode.

7. The workflow management system of claim 6, wherein the executable instructions, when executed by the at least one processor, instruct the at least one processor to, among the plurality of tasks in the workflow:

visually present the second input area of each task selected to be included in the debug mode in a first format; and visually present the second input area of each task not selected to be included in the debug mode in a second format distinctive from the first format.

8. The workflow management system of claim 1, wherein the executable instructions, when executed by the at least one processor, instruct the at least one processor to:

in response to, among the plurality of tasks, a failed task in the execution of the workflow, visually present an input area for receiving user input to resume the execution of the workflow;

in response to receiving the user input to resume the execution of the workflow, visually present a plurality of different resume options for resuming the execution of the workflow; and in response to receiving user selection of a resume option among the plurality of different resume options, resume the execution of the workflow in accordance with the selected resume option.

9. The workflow management system of claim 8, wherein the plurality of different resume options comprises at least two selected from the group consisting of:

resuming the execution of the workflow from the failed task, executing the failed task, while excluding execution of other tasks among the plurality of tasks, re-executing an entirety of the workflow, and ignoring the failed task and executing remaining tasks following the failed task in the sequence.

10. The workflow management system of claim 1, wherein the executable instructions, when executed by the at least one processor, instruct the at least one processor to:

in response to the execution of the workflow failed, visually present the workflow with an indication of failure, and visually present at least one of the plurality of tasks with an indication of failure.

11. The workflow management system of claim 1, wherein the executable instructions, when executed by the at least one processor, instruct the at least one processor to:

visually present the log information of the selected task of the workflow before the workflow execution is completed, by retrieving the log information related to the selected task from the log storage.

12. A method of workflow management, said method performed at least in part by at least one processor, said method comprising:

visually presenting a workflow comprising a plurality of tasks arranged in a sequence;

visually presenting, for each task of the plurality of tasks of the workflow, a first input area for receiving user selection whether the task is to be included in a debug mode; and among the plurality of tasks, executing one or more tasks selected to be included in the debug mode, while excluding execution of unselected tasks in the debug mode, wherein the method further comprises:

in a state where the first input area is not visually presented in each of the plurality of tasks, visually presenting, together with the workflow, a second input area for receiving user input whether to enable or disable the debug mode; and in response to receiving the user input to enable the debug mode, performing said visually presenting the first input area in each task of the plurality of tasks of the workflow.

13. The method of claim 12, wherein the second input area comprises a toggle button, a switch, a radio button, or a menu.

14. The method of claim 12, further comprising:

visually presenting the first input area of each task selected to be included in the debug mode in a first format; and visually presenting the first input area of each task not selected to be included in the debug mode in a second format distinctive from the first format.

15. The method of claim 14, wherein for each task among the plurality of tasks, the first input area comprises a toggle button having a first state corresponding to the task being included in the debug mode, and a second state corresponding to the task not being included in the debug mode, and the first format in which the first state is visually presented is distinctive from the second format in which the second state is visually presented.

16. A method of workflow management, said method performed at least in part by at least one processor, said method comprising:

executing a workflow comprising a plurality of tasks, in accordance with a sequence of the plurality of tasks in the workflow;

upon failure of one or more tasks from the plurality of tasks during the execution of the workflow, receiving a user selection of a resume option from a plurality of resume options to resume the execution of the workflow; and resuming the execution of the workflow in accordance with the selected resume option by the user selection, wherein the plurality of resume options comprises at least two selected from the group consisting of:

resuming the execution of the workflow from the failed task, executing the failed task, while excluding execution of other tasks among the plurality of tasks, re-executing an entirety of the workflow, and ignoring the failed task and executing remaining tasks following the failed task in the sequence.

17. The method of claim 16, wherein the plurality of resume options comprises all of:

resuming the execution of the workflow from the failed task, executing the failed task, while excluding execution of other tasks among the plurality of tasks, re-executing an entirety of the workflow, and ignoring the failed task and executing remaining tasks following the failed task in the sequence.

18. The method of claim 16, further comprising:

in response to the failed task, visually presenting, together with the workflow in which the plurality of tasks is arranged in the sequence, a first input area for receiving user input to resume the execution of the workflow; and in response to receiving the user input to resume the execution of the workflow, visually presenting the plurality of resume options for user selection.

19. The method of claim 18, further comprising:

in response to no failed task among the plurality of tasks upon completion of the execution of the workflow, visually presenting, instead of the first input area, a second input area for receiving user input to re-run the execution of the workflow.

\* \* \* \* \*